US008249915B2

(12) United States Patent
Iams

(10) Patent No.: US 8,249,915 B2
(45) Date of Patent: Aug. 21, 2012

(54) COMPUTER-IMPLEMENTED METHOD AND SYSTEM FOR COLLABORATIVE PRODUCT EVALUATION

(76) Inventor: Anthony L. Iams, Scarsdale, NY (US)

( * ) Notice: Subject to any disclaimer, the term of this patent is extended or adjusted under 35 U.S.C. 154(b) by 1811 days.

(21) Appl. No.: 11/197,255

(22) Filed: Aug. 4, 2005

(65) Prior Publication Data

US 2007/0033092 A1 Feb. 8, 2007

(51) Int. Cl.
*G06Q 10/00* (2012.01)
(52) U.S. Cl. ...................... 705/7.32; 705/26.7
(58) Field of Classification Search .................. None
See application file for complete search history.

(56) References Cited

U.S. PATENT DOCUMENTS

| | | | | | |
|---|---|---|---|---|---|
| 5,867,799 | A | * | 2/1999 | Lang et al. | 1/1 |
| 6,029,161 | A | * | 2/2000 | Lang et al. | 1/1 |
| 6,236,990 | B1 | | 5/2001 | Geller et al. | |
| 6,275,811 | B1 | * | 8/2001 | Ginn | 705/10 |
| 6,374,290 | B1 | * | 4/2002 | Scharber et al. | 709/205 |
| 6,598,026 | B1 | * | 7/2003 | Ojha et al. | 705/26 |
| 6,718,324 | B2 | * | 4/2004 | Edlund et al. | 1/1 |
| 6,807,566 | B1 | * | 10/2004 | Bates et al. | 709/206 |
| 6,892,178 | B1 | * | 5/2005 | Zacharia | 705/10 |
| 6,892,179 | B1 | * | 5/2005 | Zacharia | 705/10 |
| 6,895,385 | B1 | * | 5/2005 | Zacharia et al. | 705/10 |
| 6,963,848 | B1 | * | 11/2005 | Brinkerhoff | 705/10 |
| 7,013,303 | B2 | * | 3/2006 | Faybishenko et al. | 1/1 |
| 7,039,631 | B1 | * | 5/2006 | Finger, II | 1/1 |
| 7,337,126 | B2 | * | 2/2008 | Dietz et al. | 705/10 |
| 7,343,374 | B2 | * | 3/2008 | Berkhin | 1/1 |
| 7,406,436 | B1 | * | 7/2008 | Reisman | 705/10 |
| 7,428,496 | B1 | * | 9/2008 | Keller et al. | 705/7.39 |
| 7,433,832 | B1 | * | 10/2008 | Bezos et al. | 705/26 |
| 7,461,051 | B2 | * | 12/2008 | Lavine | 1/1 |
| 7,467,206 | B2 | * | 12/2008 | Moore et al. | 709/225 |
| 7,478,053 | B2 | * | 1/2009 | Dietz et al. | 705/10 |
| 7,493,320 | B2 | * | 2/2009 | Canright et al. | 1/1 |
| 7,620,651 | B2 | * | 11/2009 | Chea et al. | 1/1 |

(Continued)

OTHER PUBLICATIONS

Ding CHQ, Zha H, He X, Husbands P and Simon HD (2004). Link Analysis: Hubs and Authorities on the WorldWideWeb. SIAM Review. 46(2): 1-13.*

(Continued)

*Primary Examiner* — Lynda Jasmin
*Assistant Examiner* — Brett Feeney
(74) *Attorney, Agent, or Firm* — Gordon & Jacobson, PC

(57) ABSTRACT

Computer-implemented methods and systems provide for user collaboration in evaluating complex products over a public network. Product capabilities are preferably represented as a hierarchical taxonomy of features. Users can assign ratings and comments to the features of a product. User-submitted ratings can be qualified (or moderated) by other users. Such moderation is accomplished on a per-rating basis by user selection of one label from a set of labels that represent different levels of perceived credibility of the user that submitted the rating. A moderation score for a rating/comment is derived from the user-selected moderation labels pertaining to the rating/comment. Registered users preferably can assign weights to features, the weights representing the importance of that feature to the particular user. The user-supplied ratings as well as the moderation scores and/or weights corresponding thereto are used to compute composite ratings for user-selected product features that are communicated to the users for evaluation of the user-selected product features. Preferably, a distributed moderation process is executed that automatically grants a select subset of the user community the opportunity to moderate the ratings of other users.

21 Claims, 19 Drawing Sheets

Database Schema for Collaborative Product Evaluation System

U.S. PATENT DOCUMENTS

| | | | |
|---|---|---|---|
| 7,672,868 B1* | 3/2010 | Keller et al. | 705/7.29 |
| 7,822,631 B1* | 10/2010 | Vander Mey et al. | 705/7.29 |
| 8,108,255 B1* | 1/2012 | Robinson et al. | 705/14.44 |
| 8,140,380 B2* | 3/2012 | Keller et al. | 705/7.32 |
| 2001/0013009 A1* | 8/2001 | Greening et al. | 705/10 |
| 2002/0046203 A1* | 4/2002 | Siegel et al. | 707/1 |
| 2002/0072955 A1* | 6/2002 | Brock | 705/10 |
| 2002/0120619 A1* | 8/2002 | Marso et al. | 707/3 |
| 2002/0133365 A1* | 9/2002 | Grey et al. | 705/1 |
| 2002/0193066 A1* | 12/2002 | Connelly | 455/2.01 |
| 2003/0110056 A1* | 6/2003 | Berghofer et al. | 705/1 |
| 2003/0187721 A1* | 10/2003 | Etoh et al. | 705/10 |
| 2004/0030525 A1* | 2/2004 | Robinson et al. | 702/127 |
| 2004/0068413 A1* | 4/2004 | Musgrove et al. | 705/1 |
| 2004/0186738 A1* | 9/2004 | Reisman | 705/1 |
| 2004/0225577 A1* | 11/2004 | Robinson | 705/26 |
| 2005/0027685 A1* | 2/2005 | Kamvar et al. | 707/2 |
| 2005/0034071 A1* | 2/2005 | Musgrove et al. | 715/530 |
| 2005/0091038 A1* | 4/2005 | Yi et al. | 704/10 |
| 2005/0108082 A1* | 5/2005 | Jenkinson | 705/10 |
| 2005/0149383 A1* | 7/2005 | Zacharia et al. | 705/10 |
| 2006/0064343 A1* | 3/2006 | Burke et al. | 705/10 |
| 2006/0143158 A1* | 6/2006 | Ruhl et al. | 707/3 |
| 2006/0253584 A1* | 11/2006 | Dixon et al. | 709/225 |
| 2007/0033092 A1* | 2/2007 | Iams | 705/10 |
| 2007/0038620 A1* | 2/2007 | Ka et al. | 707/5 |
| 2007/0078669 A1* | 4/2007 | Dave et al. | 705/1 |
| 2007/0078670 A1* | 4/2007 | Dave et al. | 705/1 |
| 2007/0078699 A1* | 4/2007 | Scott et al. | 705/10 |
| 2007/0078845 A1* | 4/2007 | Scott et al. | 707/5 |
| 2007/0208613 A1* | 9/2007 | Backer | 705/10 |
| 2008/0015925 A1* | 1/2008 | Sundaresan | 705/10 |
| 2008/0120166 A1* | 5/2008 | Fernandez et al. | 705/10 |
| 2008/0256040 A1* | 10/2008 | Sundaresan et al. | 707/3 |
| 2008/0294996 A1* | 11/2008 | Hunt et al. | 715/739 |

OTHER PUBLICATIONS

Kleinberg JM (1998). Authoritative Sources in a Hyperlinked Environment. ACM-SIAM Symposium on Discrete Algorithms. 1-34.*

Langville AN and Meyer CD (2004). Deeper Inside PageRank. Internet Mathematics. 1(3): 335-380.*

Abonyi J and Abraham A (2005). Computational Intelligence in Data mining. Informatica. 29(1): 1-128.*

Gibson DA (2002). Communities and Reputation on the Web. Doctoral dissertation, UC Berkeley. 1-117.*

Langville AN and Meyer CD (2004). A survey of Eigenvector Methods for Web Information Retrieval. 1-26.*

Borodin A, Roberts GO, Rosenthal JS and Tsaparas P (2005). Link Analysis Ranking: Algorithms, Theory,and Experiments. ACM Transactions on Internet Technology. 5(1): 231-297.*

Massa P and Hayes C (2004). Page-reRank: using trusted links to re-rank authority. Proceedings of the 2005 IEEE/WIC/ACM International Conference on Web Intelligence. p. 1-7.*

Massa and Avesani (2004). Trust-Aware Collaborative Filtering for Recommender Systems. LNCS 3290, pp. 492-508.*

Mendelzon AO and Rafiei D (2000). What do the Neighbours Think? ComputingWeb Page Reputations. Bulletin of the IEEE Computer Society Technical Committee on Data Engineering. 1-8.*

Furner J. On Recommending (2002). Journal of the American Society for Information Science and Technology. 1-27.*

Berkhin P (2005). A Survey on PageRank Computing. Internet Mathematics vol. 2, No. 1: 73-120.*

Malaga RA (2001). Web-Based Reputation Management Systems: Problems and Suggested Solutions. Electronic Commerce Research. 1:403-417.*

Mui Lik, Halberstadt A and Mohtashemi (2003). Evaluating Reputation in Multi-agents Systems. LNAI: 2631 123-137.*

Ding CHQ, Zha H, He X, Husbands P, and Simon HD (2003). Link Analysis: Hubs and Authorities on the World Wide Web. LBNL Tech Report 47847. 1-12.*

Lempel R (2005). Rank-Stability and Rank-Similarity of Link-Based Web Ranking Algorithms in Authority-Connected Graphs. Information Retrieval 8: 245-264.*

Zhang L, Ma FY, Ye YM and Chen JG (2002). CALA A Web Analysis Algorithm Combined with Content Correlation Analysis Method. J. Comput. Sci. & Technol. vol.18, No. l, pp. 114-117.*

Donovan JO, Evrim V, Smyth B and McLeod D (2003). Personalizing Trust in Online Auctions. ios Press. 1-12.*

Resnick P, Zeckhauser R, Friedman E and Kuwabara K (2000). Reputation Systems. Association for Computing Machinery. 43(12): 45-48.*

Riggs T (2001). An Algorithm for Automated Rating of Reviewers. JCDL Jun. 24-28. 381-387.*

Haveliwala TH and Kamvar SD (2003). The Second Eigenvalue of the Google Matrix. Stanford University. pp. 1-8.*

Haveliwala TH (2003). Topic-Sensitive PageRank: A Context-Sensitive Ranking Algorithm for Web Search. IEEE Transactions on Knowledge and Data Engineering. 15(4): 784-796.*

Wang Y and DeWitt D (2004). Computing PageRank in a Distributed Internet Search System. Proceedings of the 30th VLDB Conference. 420-431.*

Zacharia G, Moukas A and Maes P (2000). Collaborative reputation mechanisms for electronic marketplaces. Decision Support Systems. 371-388.*

* cited by examiner

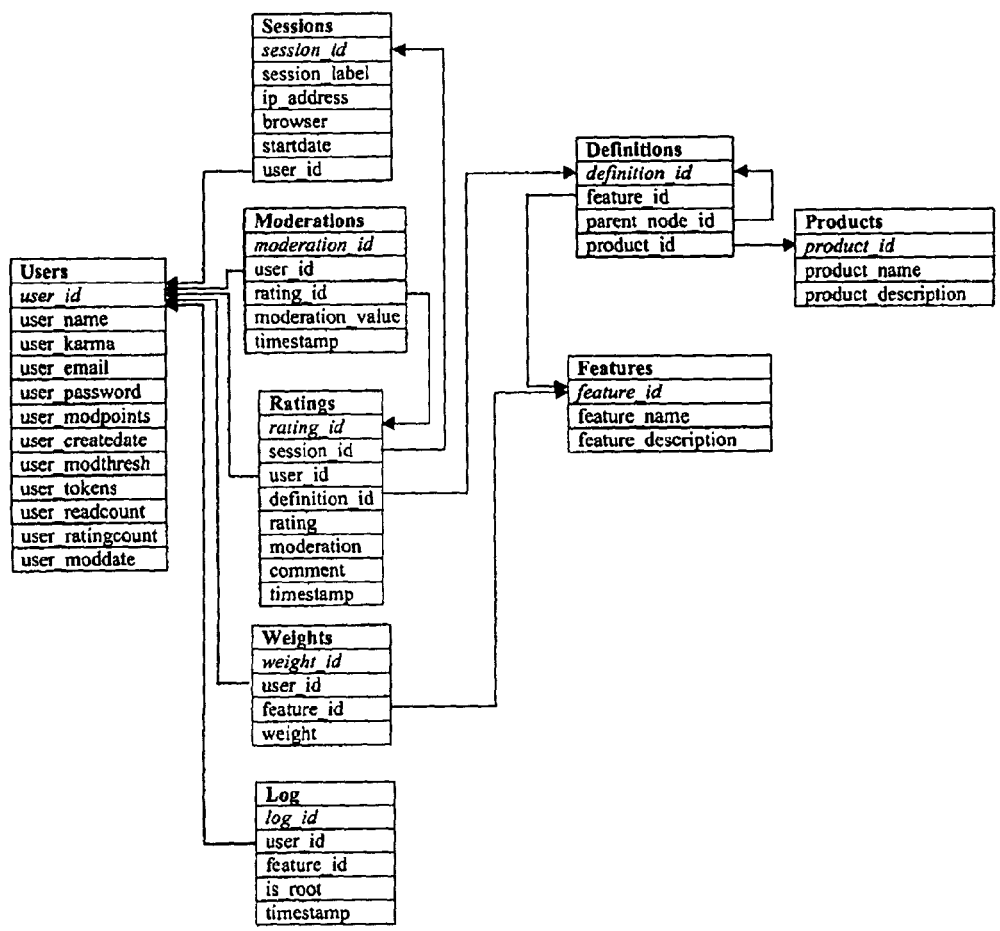
Figure 2: Database Schema for Collaborative Product Evaluation System

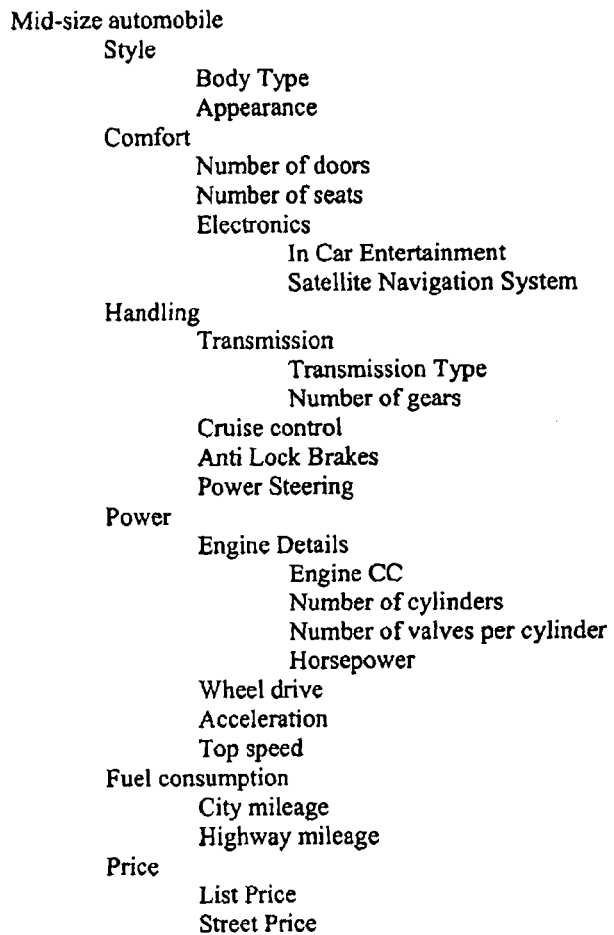
Figure 3: Sample Taxonomy of Automobile Product Features

| feature_id | feature_name | feature_description |
|---|---|---|
| 0001 | Mid-size automobile | ..... |
| 0002 | Style | ......... |
| 0003 | Comfort | ....... |
| 0004 | Handling | ............... |
| 0005 | Power | .......... |
| 0006 | Fuel Consumption | .................. |
| 0007 | Price | ........ |
| 0008 | Body type | ............... |
| 0009 | Appearance | ......... |
| 0010 | Number of doors | ........... |
| 0011 | Number of seats | ............ |
| 0012 | Electronics | ....... |
| 0013 | Transmission | ............ |
| 0014 | Cruise control | ................ |
| 0015 | Anti lock brakes | ...... |
| 0016 | Power Steering | ............ |
| 0017 | Engine details | ..... |
| 0018 | Wheel drive | .............. |
| 0019 | Acceleration | ........ |
| 0020 | Top speed | ............ |
| 0021 | City mileage | ................. |
| 0022 | Highway mileage | ....... |
| 0023 | List price | ................ |
| 0024 | Street price | .......... |
| 0025 | In-car entertainment | ....... |
| 0026 | Satellite navigation system | ............. |
| 0027 | Transmission type | ........ |
| 0028 | Number of gears | ................. |
| 0029 | Engine CC | ..... |
| 0030 | Number of cylinders | ............... |
| 0031 | Number of valves per cylinder | .......... |
| 0032 | Horsepower | ................ |

Figure 4: Feature table

| product_id | product_name | product_description |
|---|---|---|
| 0001 | Honda Accord | .......... |
| 0002 | Chevrolet Malibu | ........ |
| 0003 | Nissan Altima | ................. |
| 0004 | Toyota Camry | ......... |
| 0005 | VW Passat | ............... |

Figure 5: Product table

| definition_id | feature_id | product_id | parent_node_id | |
|---|---|---|---|---|
| 0001 | 0001 | 0001 | 0000 | Honda Accord root node |
| 0002 | 0002 | 0001 | 0001 | Style for Honda Accord (parent is "Honda Accord root node") |
| 0003 | 0003 | 0001 | 0001 | Comfort for Honda Accord (parent is "Honda Accord root node") |
| 0004 | 0004 | 0001 | 0001 | Handling for Honda Accord (parent is "Honda Accord root node") |
| 0005 | 0005 | 0001 | 0001 | Power for Honda Accord (parent is "Honda Accord root node") |
| 0006 | 0006 | 0001 | 0001 | Fuel Consumption for Honda Accord (parent is "Honda Accord root node") |
| 0007 | 0007 | 0001 | 0001 | Price for Honda Accord (parent is "Honda Accord root node") |
| 0008 | 0008 | 0001 | 0002 | Body type for Honda Accord (parent is "Style for Honda Accord") |
| 0009 | 0009 | 0001 | 0002 | Appearance for Honda Accord (parent is "Style for Honda Accord") |
| 0010 | 0010 | 0001 | 0003 | Number of doors for Honda Accord (parent is "Comfort for Honda Accord") |
| 0011 | 0011 | 0001 | 0003 | Number of seats for Honda Accord (parent is "Comfort for Honda Accord") |
| 0012 | 0012 | 0001 | 0003 | Electronics for Honda Accord (parent is "Comfort for Honda Accord") |
| 0013 | 0013 | 0001 | 0004 | Transmission for Honda Accord (parent is "Handling for Honda Accord") |
| 0014 | 0014 | 0001 | 0004 | Cruise control for Honda Accord (parent is "Handling for Honda Accord") |
| 0015 | 0015 | 0001 | 0004 | Anti lock brakes for Honda Accord (parent is "Handling for Honda Accord") |
| 0016 | 0016 | 0001 | 0004 | Power Steering for Honda Accord (parent is "Handling for Honda Accord") |
| 0017 | 0017 | 0001 | 0005 | Engine details for Honda Accord (parent is "Power for Honda Accord") |
| 0018 | 0018 | 0001 | 0005 | Wheel drive for Honda Accord (parent is "Power for Honda Accord") |
| 0019 | 0019 | 0001 | 0005 | Acceleration for Honda Accord (parent is "Power for Honda Accord") |
| 0020 | 0020 | 0001 | 0005 | Top speed for Honda Accord (parent is "Power for Honda Accord") |
| 0021 | 0021 | 0001 | 0006 | City mileage for Honda Accord (parent is "Fuel Consumption for Honda Accord") |
| 0022 | 0022 | 0001 | 0006 | Highway mileage for Honda Accord (parent is "Fuel Consumption for Honda Accord") |
| 0023 | 0023 | 0001 | 0007 | List price for Honda Accord (parent is "Price for Honda Accord") |
| 0024 | 0024 | 0001 | 0007 | Street price for Honda Accord (parent is "Price for Honda Accord") |
| 0025 | 0025 | 0001 | 0012 | In-car entertainment for Honda Accord (parent is "Electronics for Honda Accord") |
| 0026 | 0026 | 0001 | 0012 | Satellite navigation system for Honda Accord (parent is "Electronics for Honda Accord") |
| 0027 | 0027 | 0001 | 0013 | Transmission type for Honda Accord (parent is "Transmission for Honda Accord") |
| 0028 | 0028 | 0001 | 0013 | Number of gears for Honda Accord (parent is "Transmission for Honda Accord") |
| 0029 | 0029 | 0001 | 0017 | Engine CC for Honda Accord (parent is "Engine details for Honda Accord") |
| 0030 | 0030 | 0001 | 0017 | Number of cylinders for Honda Accord (parent is "Engine details for Honda Accord") |
| 0031 | 0031 | 0001 | 0017 | Number of valves per cylinder for Honda Accord (parent is "Engine details for Honda Accord") |
| 0032 | 0032 | 0001 | 0017 | Horsepower for Honda Accord (parent is "Engine details for Honda Accord") |
| 0033 | 0001 | 0002 | 0000 | Chevrolet Malibu root note |
| 0034 | 0002 | 0002 | 0033 | Style for Chevrolet Malibu |
| 0035 | 0003 | 0002 | 0033 | Comfort for Chevrolet Malibu |
| 0036 | 0004 | 0002 | 0033 | Handling for Chevrolet Malibu |
| 0037 | 0005 | 0002 | 0033 | Power for Chevrolet Malibu |
| 0038 | 0006 | 0002 | 0033 | Fuel Consumption for Chevrolet Malibu |
| 0039 | 0007 | 0002 | 0033 | Price for Chevrolet Malibu |
| 0040 | 0008 | 0002 | 0034 | Body type for Chevrolet Malibu (parent is "Style") |
| 0041 | 0009 | 0002 | 0034 | . |
| 0042 | 0010 | 0002 | 0035 | . |
| 0043 | 0011 | 0002 | 0035 | . |

Figure 6: Definition table

| user_id | user_name | user_karma | user_email | user_password | user_mod_points | user_createdate | user_mod_thresh | user_tokens | user_readcount | user_rating_count | user_moddate |
|---|---|---|---|---|---|---|---|---|---|---|---|
| 0001 | Anonymous | -100 | NULL | NULL | 0 | 01/04/05 13:01 | 0 | 6 | 544 | 0 | 00/00/00 |
| 0002 | JimBob | 15 | jb@aol.com | yznot | 2 | 01/22/05 17:19 | 0 | 21 | 32 | 5 | 05/23/05 |
| 0003 | Car Fanatic | 12 | Sc3@cmu.edu | britney | 0 | 02/04/05 23:10 | 1 | 8 | 5 | 9 | 00/00/00 |
| 0004 | Rob33 | 4 | robe@ibm.com | sdg6s | 5 | 05/21/05 10:22 | 5 | 0 | 75 | 2 | 05/24/05 |
| 0005 | The Expert | 22 | zgb@ieee.org | vbxxa1 | 0 | 05/22/05 17:01 | 2 | 17 | 113 | 22 | 00/00/00 |

Figure 7: Users table

| rating id | user id | session id | definition id | time stamp | rating | moderation | comment | |
|---|---|---|---|---|---|---|---|---|
| 0001 | 0002 | 0003 | 0115 | 05/19/05 13:01 | 4 | 1 | "Great pickup..." | User "JimBob" rates Acceleration for Toyota Camry a "4" |
| 0002 | 0005 | 0006 | 0052 | 05/19/05 17:14 | 2 | 2 | "Tops out at 80mph..." | User "The Expert" rates Top Speed for Chevrolet Malibu a "2" |
| 0003 | 0001 | 0002 | 0149 | 05/19/05 18:03 | 1 | -1 | "I have to fill up..." | User "Anonymous" rates City mileage for VW Passat a "3" |
| 0004 | 0005 | 0006 | 0149 | 05/20/05 09:15 | 5 | 3 | "I fill up only once..." | User "The Expert" rates City mileage for VW Passat a "3" |
| 0005 | 0004 | 0005 | 0073 | 05/20/05 14:23 | 1 | 1 | "I hate the look..." | User "Rob" rates Appearance for Nissan Altima a "1" |

Figure 8: Ratings table

| moderation_id | timestamp | user_id | rating_id | moderation_value | |
|---|---|---|---|---|---|
| 0001 | 05/21/05 22:10 | 0002 | 0002 | +1 | User "JimBob" moderates rating #2 up |
| 0002 | 05/21/05 23:31 | 0005 | 0001 | +1 | User "The Expert" moderates rating #1 up |
| 0003 | 05/22/05 09:15 | 0003 | 0003 | -1 | User "Car Fanatic" moderates rating #3 down |
| 0004 | 05/22/05 11:39 | 0003 | 0001 | +1 | User "Car Fanatic" moderates rating #1 up |
| 0005 | 05/22/05 13:01 | 0002 | 0005 | +1 | User "JimBob" moderates rating #5 up |
| 0006 | 05/23/05 07:30 | 0002 | 0004 | -1 | User "JimBob" moderates rating #4 down |
| 0007 | 05/23/05 08:49 | 0005 | 0003 | +1 | User "The Expert" moderates rating #3 up |
| 0008 | 05/24/05 10:01 | 0003 | 0005 | -1 | User "Car Fanatic" moderates rating #5 up |

Figure 9: Moderations table

| weight_id | user_id | feature_id | weight | |
|---|---|---|---|---|
| 0001 | 0003 | 0015 | 3 | User "Car Fanatic" weights Anti-lock brakes very important |
| 0002 | 0003 | 0004 | 4 | User "Car Fanatic" weights Handling critical |
| 0003 | 0002 | 0025 | 4 | User "JimBob" weights In-car entertainment critical |
| 0004 | 0002 | 0029 | 0 | User "JimBob" weights Engine CC irrelevant |
| 0005 | 0004 | 0003 | 4 | User "Rob33" weights Comfort critical |
| 0006 | 0002 | 0032 | 3 | User "JimBob" weights Horsepower very important |
| 0007 | 0003 | 0006 | 3 | User "Car Fanatic" weights Transmission very important |
| 0008 | 0005 | 0007 | 1 | User "The Expert" weights Price moderately important |

Figure 10: Weights table

| session id | session label | ip address | browser | startdate | user id |
|---|---|---|---|---|---|
| 0001 | s6a67m5kqw76as518 | 192.168.117.1 | IE 6.029 | 12/28/04 13:01 | 0001 |
| 0002 | lhtnrydemmd7it0z | 151.74.13.181 | Netscape 4.0 | 12/29/04 22:11 | 0001 |
| 0003 | 7mhp98cptnrdgrk7o | 19.42.114.163 | IE 5.15 | 01/02/05 09:15 | 0002 |
| 0004 | ww5lyob8ott2etz2p | 15.22.123.21 | Netscape 3.02 | 01/05/05 16:00 | 0005 |
| 0005 | nae7lp7korelsindd | 37.121.32.154 | Netscape 4.0 | 01/17/05 13:22 | 0001 |
| 0006 | ty65aoz9sht6h1z3a | 75.211.35.6 | IE 5.15 | 01/18/05 15:55 | 0004 |
| 0007 | vhil2xcpo112cpd2n | 42.121.2.66 | IE 6.029 | 01/21/05 19:16 | 0002 |
| 0008 | k5c1bth663dv7jpx1 | 64.2.155.2 | Netscape 3.02 | 02/01/05 08:07 | 0001 |

Figure 11: Sessions table

| log id | user id | feature id | is root | timestamp | |
|---|---|---|---|---|---|
| 0001 | 0001 | 0001 | 1 | 01/28/05 16:30 | User "Anonymous" read the top-level ratings (Mid-size automobile) |
| 0002 | 0003 | 0027 | 0 | 02/05/05 11:44 | User "Car Fanatic" read the ratings for Transmission Type |
| 0003 | 0002 | 0001 | 1 | 02/07/05 22:06 | User "JimBob" read the top-level ratings (Mid-size automobile |
| 0004 | 0002 | 0018 | 0 | 02/15/05 09:51 | User "JimBob" read the ratings for Wheel drive |
| 0005 | 0001 | 0024 | 0 | 02/21/05 15:09 | User "Anonymous" read the ratings for Street Price |

Figure 12: Log table

COMPUTER-IMPLEMENTED METHOD AND SYSTEM FOR COLLABORATIVE PRODUCT EVALUATION

BACKGROUND OF THE INVENTION

1. Field of the Invention

This invention relates broadly to computer software that executes on a web server platform. More particularly, this invention relates to computer software that executes on a web server platform and enables web-based users to collaborate in the evaluation of product features.

2. State of the Art

Buyers considering the acquisition of complex technology products, such as computer systems or automobiles, sometimes face difficult choices. Such products typically have an extensive and diverse set of functional capabilities, which customers try to match with their specific requirements. It can be challenging for buyers to weigh the functional tradeoffs between a set of similar products in order to make a choice that best meets their needs. In particular, it can be difficult to obtain accurate information about the true functional capabilities of products that are being evaluated. Product suppliers tend to highlight their strongest features in marketing information, while they may obscure information about weaker features. Customers who are already using a product have an un-biased understanding of how well it works, and thus are in a position to provide the most accurate information about the quality of product features.

Global networks such as the World Wide Web (WWW or common referred to the "web") potentially provide a means to connect directly with users who are willing to share information about their experiences with products. Indeed, web sites such as epinions.com and bizrate.com allow users to submit ratings for a broad range of products. However, these sites only allow users to assign ratings at a relatively high level. Users can provide an overall grade for a product, and typically only two to five detail grades addressing specific product characteristics. While these web-based product evaluation systems may be sufficient for relatively simple products, they are not suitable for more complex products with more extensive feature sets. More particularly, different users have different requirements and thus have different views of a products' value. The high level ratings captured by such systems do not allow users to rate and/or comment on specific product features and thus fail to provide information that is particularly relevant to the specific requirements for different users.

Web-based product evaluation systems have been proposed that enable the quality of products or services to be graded at multiple levels of detail. For example, see U.S. Pat. No. 6,236,990 to Geller et al. These systems organize complex feature sets hierarchically to reflect the structure of a product or service. Users can assign weights to the different levels of the hierarchy to reflect the importance of a particular function to their requirements. These weights are then used to arrive at composite scores for products. However, these systems do not necessarily take advantage of the knowledge of product users. Rather, ratings are given to individual product features from experts who are employed by system managers. As a result, the evaluation process is somewhat labor intensive. The more complex a product is, the more parts it can be decomposed into, and the more expert resources are required to maintain the ratings in each of the functional areas. Further, the experts may not have sufficient data for a particular product feature to be able to form an accurate rating.

SUMMARY OF THE INVENTION

It is therefore an object of the invention to provide a system that allows for efficient and effective collaborative evaluation of complex products.

It is another object of the invention to provide such a system where users access the system over a public network such as the Internet.

It is a further object of the invention to provide such a system where users submit ratings for different features of one or more products.

It is also an object of the invention to provide such a system where certain users are automatically selected to moderate the ratings of other users to provide feedback to the user community.

It is another object of the invention to provide such a system wherein the moderations submitted by the users of the system are used to derive the product summaries presented to the users on an ad-hoc per user basis such that the product summaries are tailored for the specific user's requirements.

It is a further object of the invention to provide such a system wherein users are capable of assigning weights to different product features, wherein the assigned weights are used to derive the product summaries presented to users on an ad-hoc per user basis such that the product summaries are tailored for the specific user's requirements.

In accord with these objects, which will be discussed in detail below, an improved computer-implemented method and system provides for user collaboration in evaluating the quality of complex products over a public network such as the Internet. The system preferably represents product capabilities as a hierarchical taxonomy of features. Users can assign ratings to features of a product, along with a written explanation of the rating, representing their assessment of the quality of that feature's implementation.

In the preferred embodiment, the user-submitted ratings are qualified (or moderated) by other users. Such moderation is accomplished on a per-rating basis by user selection of one label from a set of labels that represent different levels of perceived credibility of the user that submitted the rating. A moderation score for a rating/comment is derived from the user-selected moderation labels pertaining to the rating/comment. In addition, registered users can also assign weights to features, the weights representing the importance of that feature in the user's particular environment. The user-supplied ratings as well as the moderation scores and/or weights corresponding thereto are used to compute composite ratings for user-selected product features. The composite ratings are communicated to the users for evaluation of the user-selected product features. The composite ratings reflect the suitability of each product for a particular user's requirements. Preferably, a distributed moderation process is executed that automatically grants a select subset of the user community the opportunity to moderate the ratings of other users.

It will be appreciated that such a computer-implemented method and system enables a user to traverse through the feature set of one or more complex products. During such traversal, the user is presented with composite ratings for user-selected product features that reflect the suitability of the user-selected product features for the particular user's requirements.

Additional objects and advantages of the invention will become apparent to those skilled in the art upon reference to the detailed description taken in conjunction with the provided figures.

BRIEF DESCRIPTION OF THE DRAWINGS

FIG. 2 is a schematic representation of the schema of the database of the web-based collaborative product evaluation system of FIG. 1.

FIG. 3 is an exemplary hierarchical taxonomy of product features for mid-sized automobiles, which is used to define the hierarchical structure of feature levels employed by the system of FIG. 1.

FIG. 4 is a schematic representation of an exemplary Feature table that is part of the database of FIG. 1, which stores data representing the product features that are collaboratively evaluated by the system of FIG. 1.

FIG. 5 is a schematic representation of a Product table that is part of the database of FIG. 1, which stores data representing the products that are collaboratively evaluated by the system of FIG. 1.

FIG. 6 is a schematic representation of a Definition table that is part of the database of FIG. 1, which stores data representing the hierarchical structure of feature levels that are employed by the system of FIG. 1.

FIG. 7 is a schematic representation of a Users table that is part of the database of FIG. 1, which stores data representing the users of the system of FIG. 1.

FIG. 8 is a schematic representation of a Ratings table that is part of the database of FIG. 1, which stores data representing the ratings submitted by users of the system of FIG. 1.

FIG. 9 is a schematic representation of a Moderations table that is part of the database of FIG. 1, which stores data representing moderations provided by users of the system of FIG. 1.

FIG. 10 is a schematic representation of a Weights table that is part of the database of FIG. 1, which stores data representing weight factors that are assigned to product features by users of the system and used in the computation of evaluation scores at the feature levels of the system of FIG. 1.

FIGS. 11 and 12 are schematic representations of a Sessions table and a Log table, respectively, that are both part of the database of FIG. 1, which store data representing usage parameters that are collected by the system of FIG. 1.

DETAILED DESCRIPTION

Figure 1:
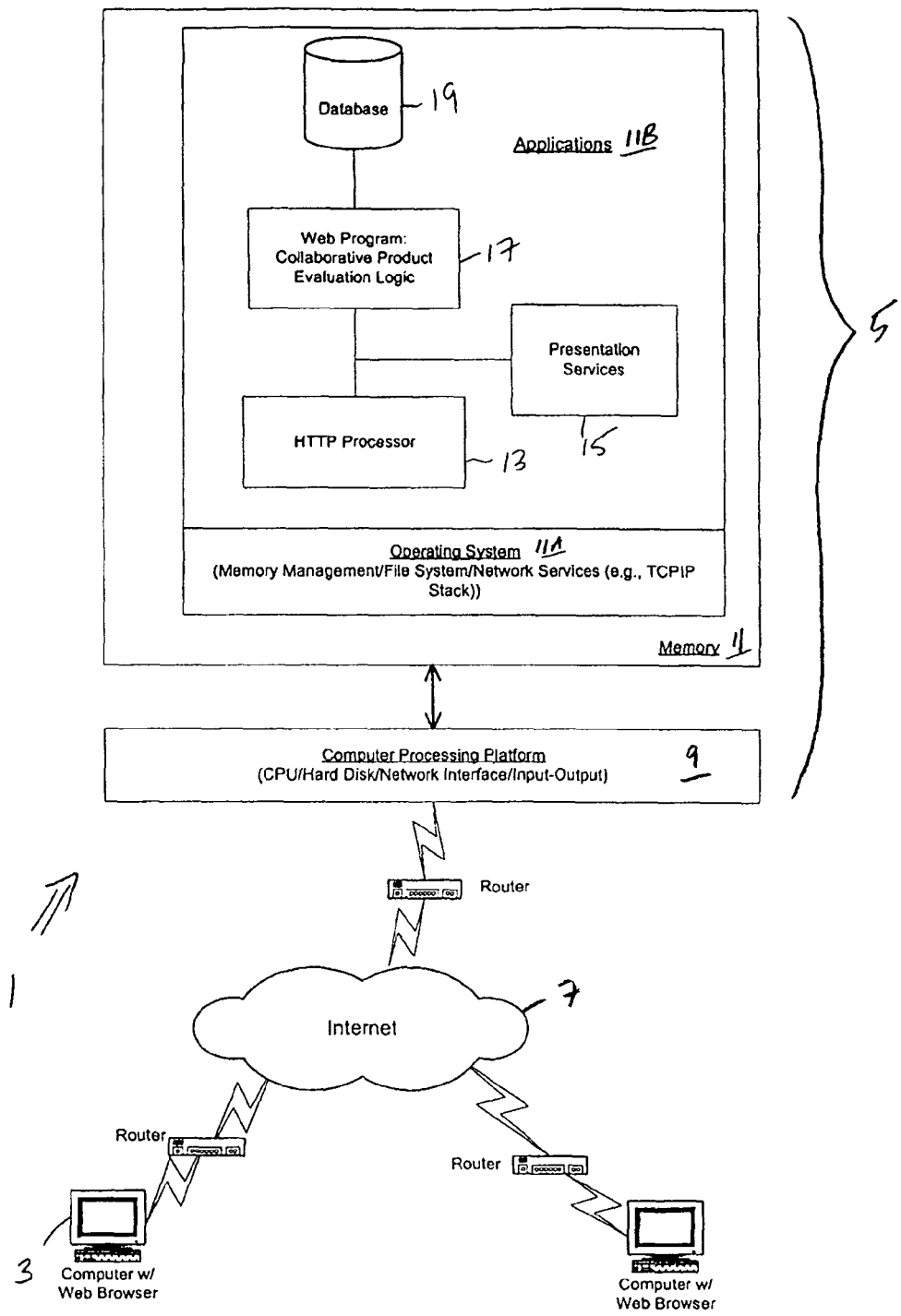
FIG. 1 is a block diagram of a web-based collaborative product evaluation system in accordance with the present invention.

Turning now to FIG. 1, there is shown the architecture of a collaborative product evaluation system 1 in accordance with the present invention. Users utilize a web browser executing on a computing device 3 to connect to a web server 5 over the network 7 (e.g., Internet). Preferably, the browser-based interaction between the computing devices 3 and the web server 5 occur over TCP/IP sessions established therebetween over which are communicated HTML-based (and possibly XML-based) documents and commands as well as other messages, commands and data.

The web server 5 includes a computer processing platform 9, which is realized by one or more microprocessors (not shown) that interface to a memory system 11. The microprocessor(s) also interface to persistent data storage (e.g., one or more hard disk drives), a network interface device (e.g., an ethernet adapter) and possibly input-output devices (e.g., keyboard, mouse, display). The memory system 11, which is typically realized by one or more volatile DRAM modules, stores an operating system 11A and software applications 11B that execute on the computer processing platform 9. The operating system 11A is loaded from the persistent data storage of the platform 9 into the memory system 11 during start-up by boot-rom. The operating system 11A provides basic system facilities including memory management, a file system, network services (e.g., a TCPIP stack), input/output device management, process management, and interprocess communication, timer and system clock handling, and system startup management. The operating system 11A can be realized by many commercially-available operating systems, such as SUN's Solaris OS, IBM's AIX OS, Hewlett-Packard's HP-UX OS, Microsoft's Windows XP OS, Apple's OSX OS, variants of the Linux OS such as those distributed by Red Hat, and others. The network interface of the platform 9 together with the network services of the operating system 11A provides a bidirectional communication link to the browser-based client device 3 over the Internet via routing devices and other communication hardware as is well known in the networking arts.

The software applications 11B are loaded from the persistent data storage of the platform 9 in to the system memory 11 as dictated by the user (e.g., user interaction with input/output devices or possibly by a script). The software applications 11B, which include an HTTP Processor 13, Presentation Services 15, Web Program 17 and a database 19, cooperate to serve up dynamic web pages (and possibly static web pages as well) in response to requests (which typically conform to a standard protocol such as HTTP) received at an assigned IP address and port number as is well known. The dynamic web pages include information stored (or derived from) data stored in the databases 9.

The HTTP Processor 13 establishes connections to and from the client devices 3. HTTP requests (and possibly other commands, code and data) are received from the client devices over these connections. The HTTP Processor 13, Presentation Services 15, Web Program 17 and a database 19 cooperate to serve up dynamic web pages (and possibly static web pages as well) in response to the received HTTP requests in accordance with predetermined software logic. The software logic provides for collaborative product evaluation as will be described in more detail below. The Presentation Services 15 is a facility that enables delivering dynamic content to client browsers. Preferably, the Presentation Services 15 support Active Server Pages, JavaServer pages, server-side scripting such as Perl, CGI, PL/SQL scripting, etc. The HTTP Processor 13 and the Presentation Services 15 may be realized by commercially available HTTP web servers, such as the Apache Web Server, Microsoft Internet Information Server, and Sun ONE Web Server. In the preferred embodiment, the HTTP processor 13, Presentation Services 15, Web Program 17 and the database 19 are persistently stored and executed on the same computer processing platform 9. Alternatively, these application components can be distributed over multiple computer systems, which can be coupled together via a LAN, WAN, or the Internet as is well known.

The HTTP Processor 13 and the Web Program 17 provides for login and authentication of users as described below. Such login and authentication can utilize password-based authentication, services-based authentication (e.g., Microsoft Passport authentication), certificate-based authentication, or any other authentication scheme.

The core of the web server 5 is the database 19, which maintains the following information preferably in the form of relational tables as described below:

Feature Data: data defining feature levels pertaining to the functional capabilities of a product. A feature level may represent a specific product function (i.e. "number of transmission gears"), a group of related product functions (i.e. "transmission"), or a group of other feature groups (i.e. "handling"). In the preferred embodiment, the feature data is stored as a relation table that contains a record for each possible features level. Each record contains a unique feature ID number; a feature name; and a brief description of the feature and its potential significance.

Product Data: data for products that can be evaluated by users the system. In the preferred embodiment, the product data is stored in a relational table that contains a record for each product. The record includes a unique product ID number; the product name; and a brief description of the product.

Definitions Data: data that defines hierarchies of feature instances constituting actual products. In the preferred embodiment, the definitions data is stored in a relational table that contains a record for each node in these hierarchies. The record includes a unique definition ID number; the ID number of a feature in the Features table; the ID number of the product that this node is a member of; and the ID number of the parent definition node (which is zero if the node is the root of the hierarchy).

User Data: data for users who have identified themselves. In the preferred embodiment, the user data is stored in a relational table that contains a record for each such user. The record includes a user ID; a nickname; a password; an email address; a "karma" quotient representing the credibility that the user has established, based on criteria described below; the number of moderation points the user currently has available, and the date and time on which they were granted; the date and time when the user registered with the system; the moderation threshold at which the user prefers to view ratings; the number of tokens that the user has accumulated (these are used by the moderation mechanism to determine when to assign moderation points to a user as described below); the number of feature ratings pages that the user has recently read; and the total number of ratings that the user has submitted. The first record is reserved for a pseudo-user with the nickname "Anonymous" to which all anonymous ratings are attributed.

Ratings data: data for the feature ratings that have been submitted by users. In the preferred embodiment, the ratings data is stored in a relational table that contains a record for each user-submitted feature rating. The record includes a unique rating ID number; the ID number of the user who submitted the rating (which is 0001 for the "Anonymous" pseudo-user); the session ID number of the browser from which the rating was submitted; the date and time when the rating was submitted; the ID number of the definition node to which the rating is attached (i.e. the instance of a feature within a specific product); the rating (a value selected by the user from a predetermined range of values (in the preferred embodiment, a range of integer values between 0 and 4); and the text of a comment to explain the rating.

Weights data: data about the weights that specific users have attached to individual features. The weights data represents the importance of that feature in their environment. In the preferred embodiment, the weights data is stored in a relation table that contains records that are generated every time a user attaches a weight to a feature. The record has a unique weight ID number; the ID number of the user who set the weight; the ID number of the feature that is being weighted; and a weight factor (a value selected by the user from a predetermined range of values, which in the preferred embodiment is the range of integers between 0 and 4).

Sessions data: data about the interactions that users initiate with the system. In the preferred embodiment, the Sessions data is stored as a relational table that contains a record for each instance that a user engages with the system. The record has a unique session ID number; the IP address of the user who initiated the session; and the ID number of the user who initiated the session, if they have identified themselves, or zero if they have not.

Moderations data: data about the moderations that have been applied. In the preferred embodiment, the moderations data is stored in a relational table that contains a record for each instance that a user moderates a rating. The record has a unique moderation ID number; the date and time when the moderation occurred; the ID number of the user who applied the moderation; the ID number of the rating that was moderated; and a moderation value (in the preferred embodiment, this can be either +1 or −1).

Log data: data that logs readership of the site. In the preferred environment, the log data is stored in a relation table that contains a record for each instance that the system displays a page showing the ratings for a feature. The record has a unique log ID number; the ID number of the user who is viewing the page (which is 0001 for the "Anonymous" pseudo-user); the ID number of the feature that is being rated on this page; a flag indicating whether the feature is at the "root" of the definition tree (i.e. shows the top-level ratings for the evaluated products); and the date and time when the page was displayed.

In the preferred embodiment, the database 19 is realized by a relational database that stores information in tables. FIG. 2 shows a graphical representation of the schema for the preferred embodiment of the database 19, including the structure of the database tables, and the relationship between tables. The contents of each table are described in more detail below.

Turning now to FIG. 4, the Features table contains information about the levels of functional capability in a product, ranging from individual product features through higher-level functions, i.e. groups of features, all the way up to the broadest functional categories. For example, consider the taxonomy of functions of a mid-size automobile as shown in FIG. 3. The Features table can represent this taxonomy with the records shown in FIG. 4.

The Products table as shown in FIG. 5 contains high-level information about each product to be evaluated. Each record has a unique product ID number, a product name, and description of the product. For example, to compare a group of similar automobiles, a set of records would be added to the Products table as shown in FIG. 5.

The Definitions table of FIG. 6 is used to instantiate the actual products that should be evaluated. For each product, a record with a unique ID number is created in the Definitions table for every possible level of functionality, mirroring the records in the Feature table. The records in the Definitions table are linked via the "parent_node_id" field to represent the taxonomy tree for each evaluated product. The "parent_node_id" field for the lowest-level product functions (i.e. leaves of the tree, such as "number of transmission gears") is set to the ID number of the definition record representing a group of related product functions (i.e. "transmission"). The "parent_node_id" for that definition record is set to the id of the definition record for a higher-level group of feature groups (i.e. "handling"), and so on. The highest-level group is considered a "root" node, and its "parent_node_id" is set to zero. For example, to instantiate the five automobile product features in the earlier example, the Definitions table would be populated as shown in FIG. 6.

The Users table of FIG. 7 contains information about users of the system 1, i.e. users who have registered with a valid email address. Each user is assigned a unique ID number, and they choose a unique nickname. Each registered user is assigned a password that they use to log into the system (typically, an initial system-generated password is sent to the user to verify that their email address is valid). The Users table also registers the following values for each user to help with the moderation process (see below):

The date and time when the user registered. In the preferred embodiment, users are not given moderation privileges until they have been registered with the system for some fixed period of time, at least several days. Such delay makes it more difficult for people to create new accounts simply to gain moderator access. Such delay also allows users to gain an understanding of the way the system works before they can moderate ratings.

The number of feature pages that the user has recently read. In the preferred embodiment, the system tracks the average number of times that the user has viewed ratings pages, focusing on "deep" reads, i.e. not just the top-level ratings, but ratings of individual features lower in the taxonomy. The moderation process uses this data to select users from the middle of the pack, i.e. eliminating obsessive-compulsive readers who have an unusually large number of views, as well as those who visited the site just once, or not at all, during the past few weeks.

The total number of ratings that the user has submitted to the system.

A "karma" value, which in the preferred embodiment is an integer in the range between −100 to +100, that provides an indication of the moderation scores provided by other moderators with respect to the user's ratings. The more high scores that the user receives from other moderators for their ratings, the higher their karma value.

The number of moderation points that are available to the user. These points are automatically assigned to users by the moderation process.

The date and time when the user was granted moderation points. In the preferred embodiment, moderation points expire after a limited period of time in order to prevent hording.

The number of "tokens" that the user has accumulated from the moderation process. In the preferred embodiment, the moderation process continuously distributes tokens to users based on a formula that considers the number of ratings that have recently been submitted to the system, and the number of unspent moderation points remaining after their expiration period. Users collect these tokens over time, and when a critical mass is reached, they are converted to moderation points (see below).

The moderation level (sometimes referred to herein as "moderation threshold level") that represents the threshold moderation level at which the user prefers to view ratings. When the user logs in, the system only displays ratings that have been rated at this moderation level or higher. The system also displays product summary ratings that are derived from ratings that have been rated at this moderation level or higher.

The first entry in the Users table is reserved for the pseudo-user with the nickname "Anonymous". This user has no email address or password, and always has the lowest possible karma and zero moderation points. FIG. 7 shows an example of how the Users table would be populated with four registered users.

The Ratings table of FIG. 8 is used to register ratings that users assign to features of specific products. Any user may assign a rating to a product feature, but they may only assign a single rating (this restriction is enforced using the Sessions table described below). Each record in the Ratings table is assigned a unique rating ID and a user ID, if the rating was submitted by a registered user, or the value "1" if the rating was submitted anonymously, representing the "Anonymous" pseudo-user. Each rating is also associated with a session ID number from the Sessions table (see below).

Each Ratings record corresponds to a record in the Definition table (FIG. 6), representing a specific product feature that the rating is attached to. In the preferred embodiment, ratings are only assigned to leaves of a product definition, i.e. the lowest level of functional detail. For example, in the case of the automobile evaluation, users could attach a rating to one of the "Engine CC" records in the Definition table, but not the "Engine Details" or "Power" records. The intent is for users to assign ratings to specific details, rather than more subjective ratings of broader functional areas or entire products. This constraint is implemented in software logic that adds records to the Ratings table. Each Ratings record also contains a field representing the cumulative moderation score for the rating. The cumulative moderation score can be an integer between −1 and +5, and it is continuously recalculated based on entries in the Moderations table pertaining thereto (see below). Finally, the Ratings record contains text with a comment that the user entered to justify the rating. FIG. 8 shows how the Ratings table would be populated with some ratings of the automobile functions in the earlier example.

The Moderations table of FIG. 9 is used to register moderations that select users have assigned to ratings of other users. Every time a user moderates a rating of another user, a record is created in the Moderations table, containing a unique ID and a moderation value. In the preferred embodiment, the moderation value assigned to a rating is an integer value (e.g., +1 or −1) that depends upon a user-selected label associated with the rating (e.g., "Convincing", "Somewhat Credible", Good Point", Weak", "Marketing Hype", "FUD", "Troll". Each record in the moderation table corresponds to a record in the Ratings table and a record in the Users table. When a moderation for a particular rating is submitted, the moderation value(s) (e.g., +1, −1) for the particular rating are retrieved from the Moderations table and added to the base score for the rating. The resultant sum is then bounded at a maximum of 5 and minimum of −1 to thereby provide a cumulative moderation score for the rating. The cumulative moderation score for the particular rating is added to the Ratings table. Only registered users may moderate, i.e. the "Anonymous" pseudo-user may not create records in the Moderation table. Further, users may not moderate their own ratings, and they may only apply a single moderation to a rating. These constraints are implemented in software logic that adds records to the Moderations table. FIG. 9 shows the Moderations table populated with moderations of the ratings submitted for the automobile functions in the earlier example.

The Weights table of FIG. 10 is used to store weights that registered users assign to particular product features. Each record has a unique ID number, an ID number for the user submitting a weight, an ID number of a record in the Features table corresponding to the feature the user is weighting, and a weight factor representing the relative importance of that feature to the user. The weight factor is expressed as an integer in the range of 0-4, whereby 0 means that the feature has the lowest priority, 4 means it has the highest priority, and 2 means it has an average priority. The value 2 is assumed to be the default for all features, unless a user specifies a weight factor by adding a record to the Weights table. The weight factor can be assigned to any record in the Features table, i.e. the user may specify a weight factor for product features at any level, from the lowest-level details to the highest-level functional categories. Again, only registered users may add weights to the Weights table, so the "Anonymous" pseudo-user is not permitted to add records. FIG. 10 shows an example of the Weights table populated with some weight factors that users have assigned to automobile features in the earlier example.

The Sessions table of FIG. 11 is used to maintain information about users of the system. A record is created in this table for each user that connects to the system, including a unique session ID number; a label containing a unique string of characters that is randomly generated by the system, which serves as a "cookie" that is left behind on the user's browser; the Internet Protocol (IP) address of the system from which the user is connecting; the name of the web browser that the user is connecting from; the date that the session was initiated; and an ID number in the Users table, if the user has registered with the system and logged in with their password. The system uses the information in this table to quickly determine whether a user is registered, or is participating anonymously. It also uses the data to enforce constraints about data submitted to the other tables, i.e. multiple postings of ratings; moderation of a rating by the user who submitted the rating, etc. FIG. 11 shows an example of how the Sessions table might be populated based on some user connections.

The Log table of FIG. 12 is used to keep track of which feature ratings pages are viewed by users. Every time a page is viewed, an entry is generated in this table. Each log record has a unique ID number, an ID number for the user who viewed the page (which is 0001 for the "Anonymous" pseudo-user), and a timestamp specifying the date and time when the viewing occurred. The record also registers which feature rating was displayed, as well as a flag representing whether the feature is the root of the production definitions being compared. This information is used by the moderation process to credit users with "deep" reads, i.e. reviewing the ratings of individual features lower in the taxonomy rather than just the top-level ratings. FIG. 12 shows an example of how the Log table might be populated based on certain browser activity.

Figure 13A:
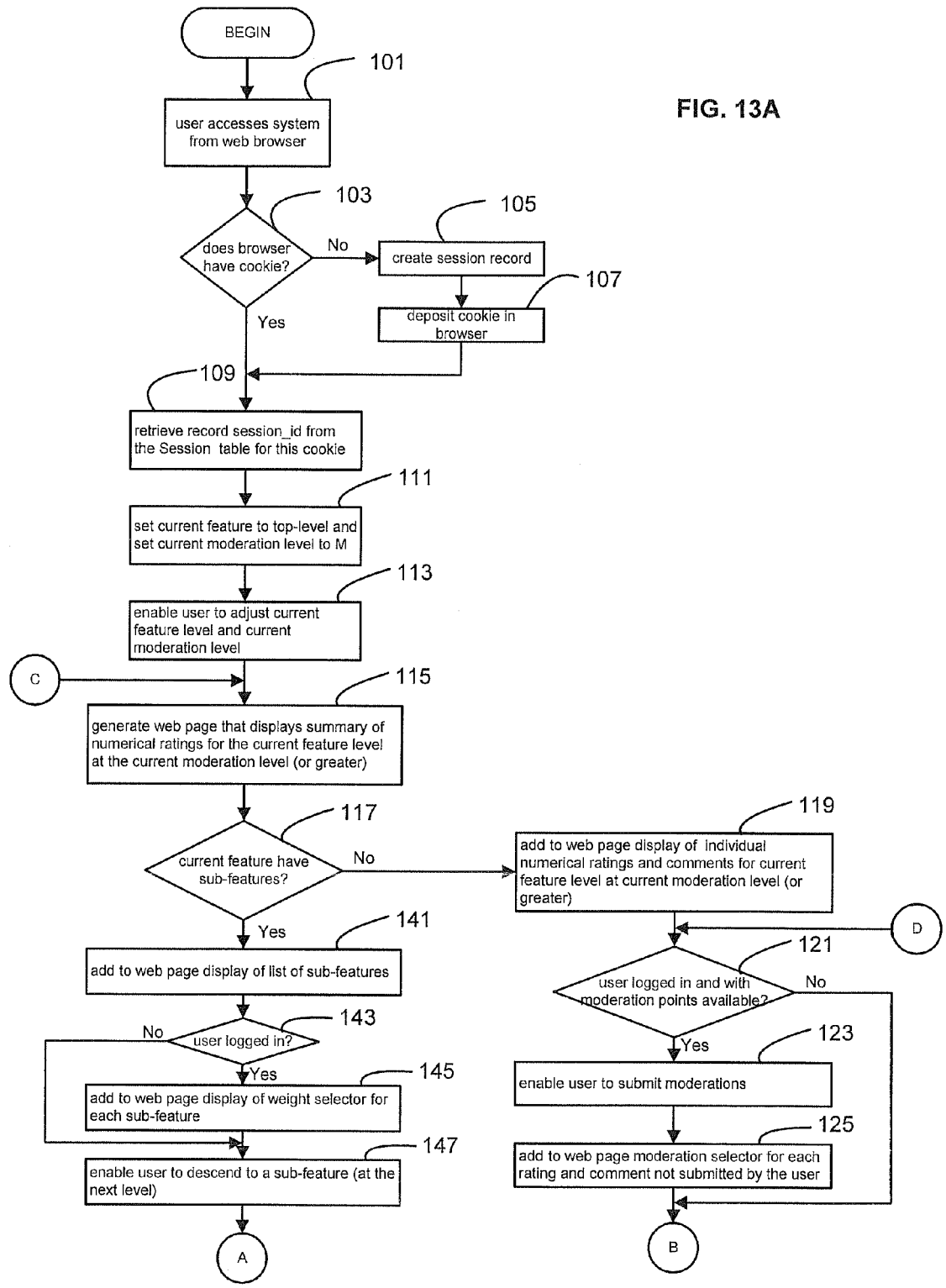
FIGS. 13A and 13B, collectively, are a flow chart that illustrates the operation of the system of FIG. 1 in providing collaborating evaluation of product features in accordance with the present invention.
Figure 13B:
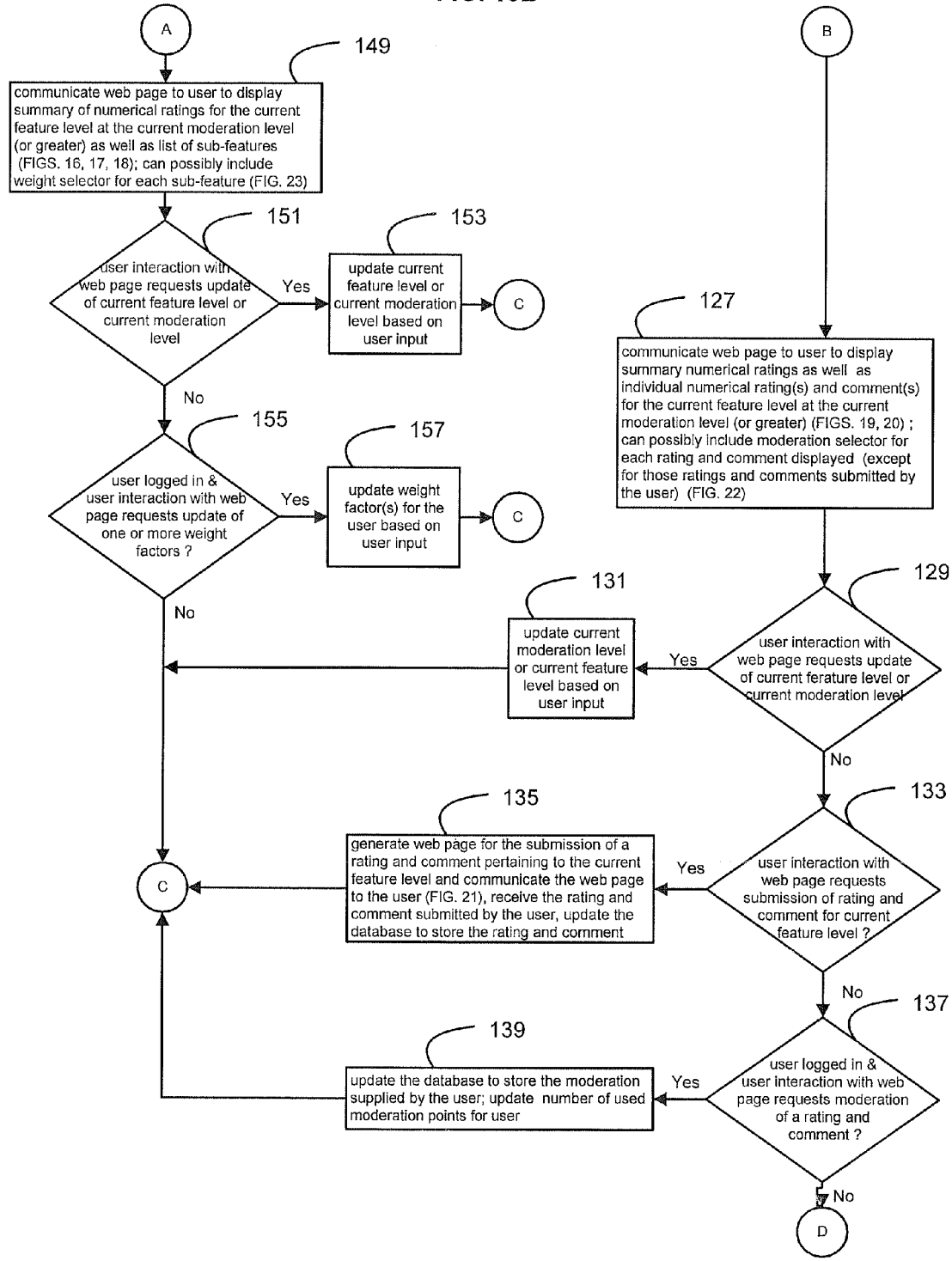

FIGS. 13A and 13B, collectively, are a flow chart illustrating the high level operational procedure of the software logic realized by the applications 11B (e.g., HTTP Processor 13, Presentation Services 15, Web Program 17 and database 19) of FIG. 1. It is assumed that an administrator has initialized the system by entering data into the Products, Features, and Definitions tables of the database 19. The administrator populates the Products table with the names of products that will be considered in an evaluation. Next, the administrator populates the Features table with the feature groups and details that are common to the evaluated products. Then, the administrator populates the Definitions table with the structures of products to be evaluated, linking each Definitions record back to records in the Features and Products tables as described above. Finally, the administrator makes a user interface accessible to the Internet that can be used to add records to the Sessions, Users, Ratings, Weights, and Moderations table, and displays the results of evaluations.

In block 101, a user connects to the web server 5 with a web browser. In block 103, the operations first determine if that browser has connected to the system before by scanning for a cookie that matches a session label in the Sessions table. If no matching cookie is found, a new record is created in the Sessions table with an automatically generated session label (block 105), which is deposited in the browser with a cookie (block 107). The new record for the Session table created in block 105 initially receives a "user_id" value of 0001, representing the "Anonymous" pseudo-user. The new record also includes the IP address of the connected browser, the type of browser, and the current date.

If a matching cookie is found in block 103, the operations continue to block 109 wherein the "user_id" field of the Sessions record is retrieved. If the "user_id" field of the Sessions record is not 0001 (which represents the pseudo-user "Anonymous"), the system accesses the record from the Users table based on the "user_id" field, and displays relevant information for the user who is logged in. If the value is 0001, the interface presents an opportunity for the user to log in with their nickname and password. If the nickname is authenticated with the correct password, the "user_id" field of the Sessions record is set to the record ID number in the Users table corresponding to that nickname. In both cases, the operations set the current feature level to the top-level and set the current moderation threshold level to the default moderation threshold level for the user (block 111) and enables the user to adjust the current feature level and current moderation threshold level (block 113).

Figure 16:
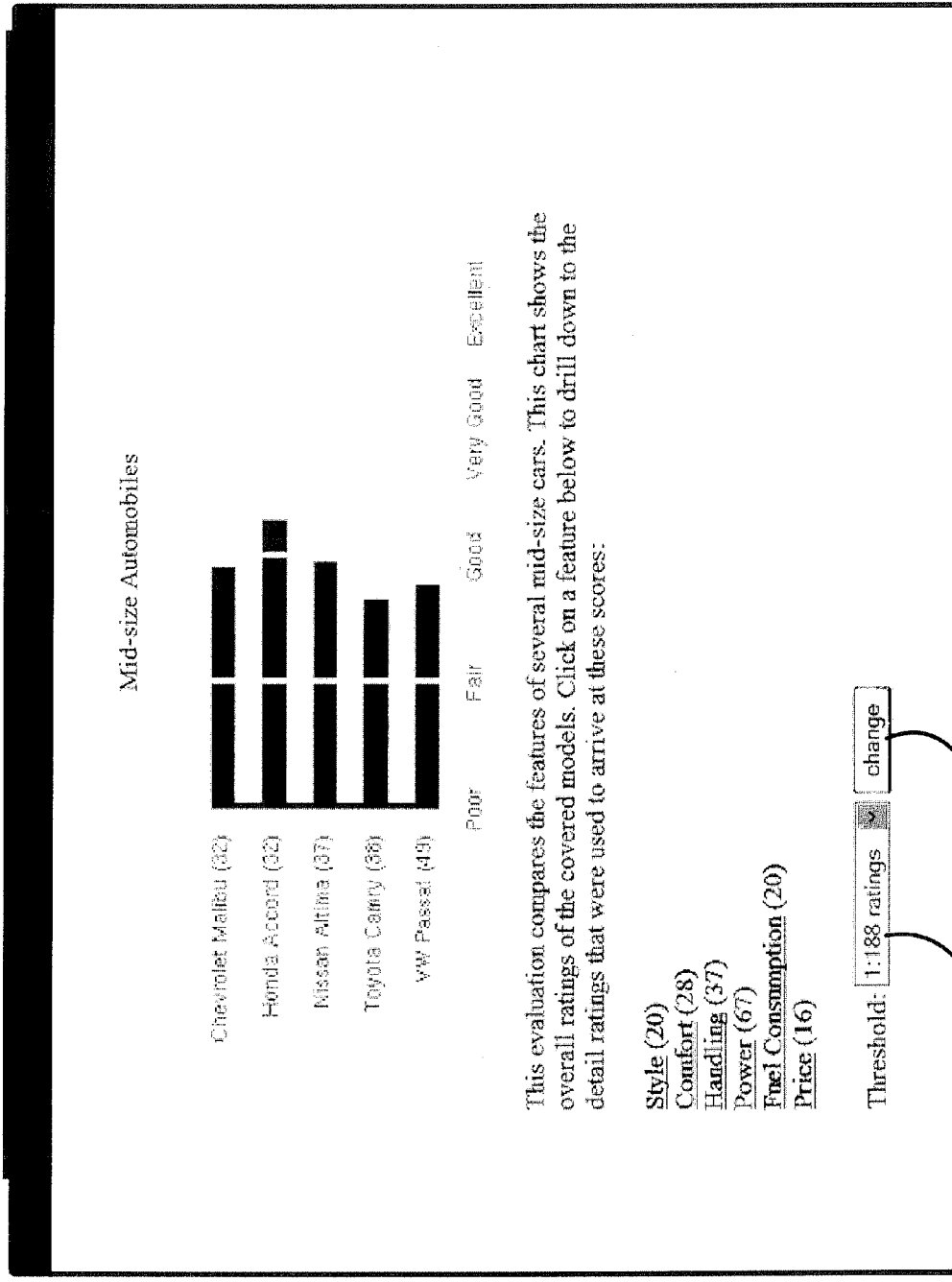
FIG. 16 is a pictorial illustration of an exemplary web page that is generated and communicated to a user of the system of FIG. 1 for the top feature level defined for mid-sized automobiles with a moderation threshold value of "1".
Figure 17:
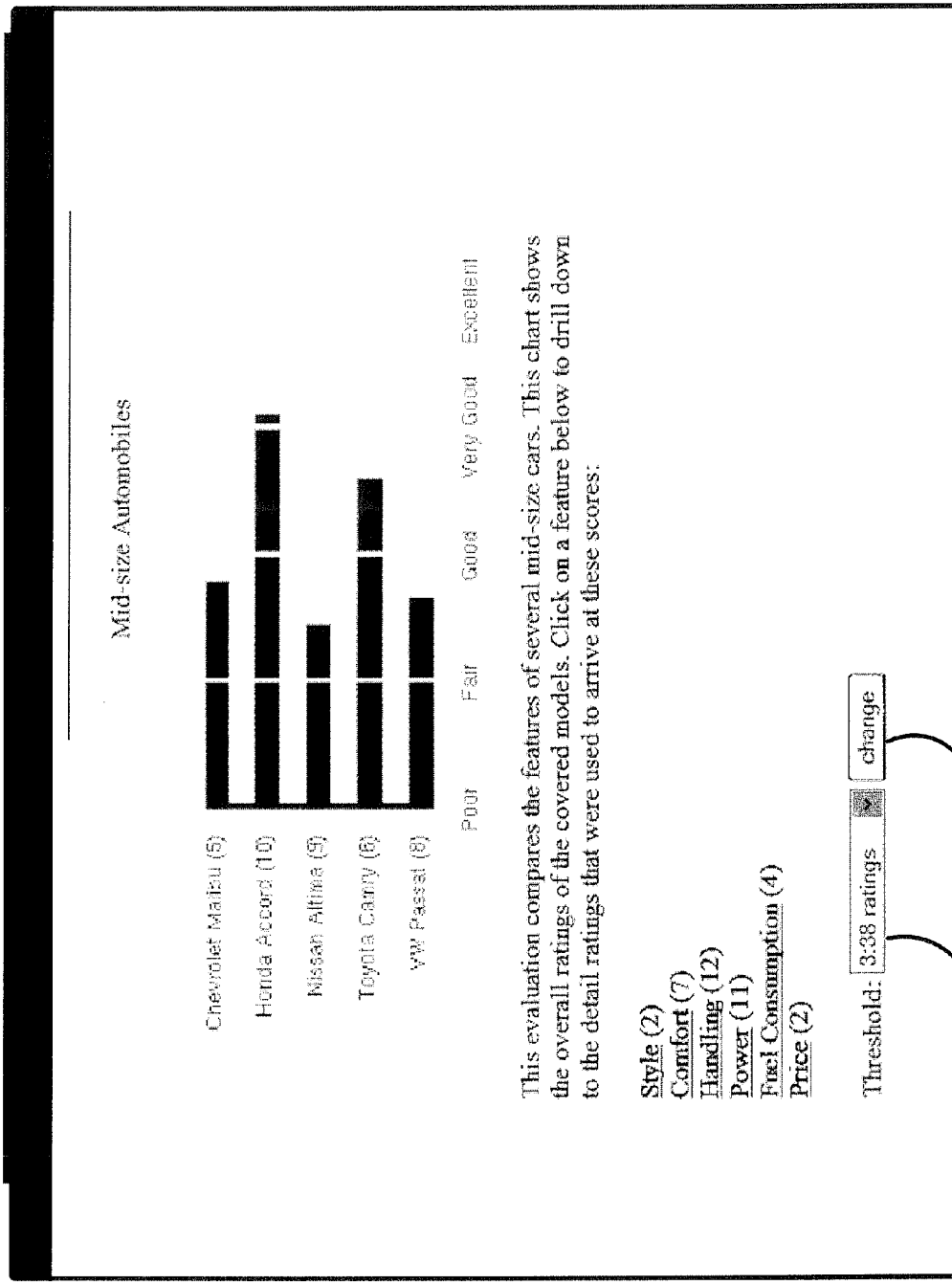
FIG. 17 is a pictorial illustration of an exemplary web page that is generated and communicated to a user of the system of FIG. 1 for the top feature level defined for mid-sized automobiles with a moderation threshold value of "3".
Figure 18:
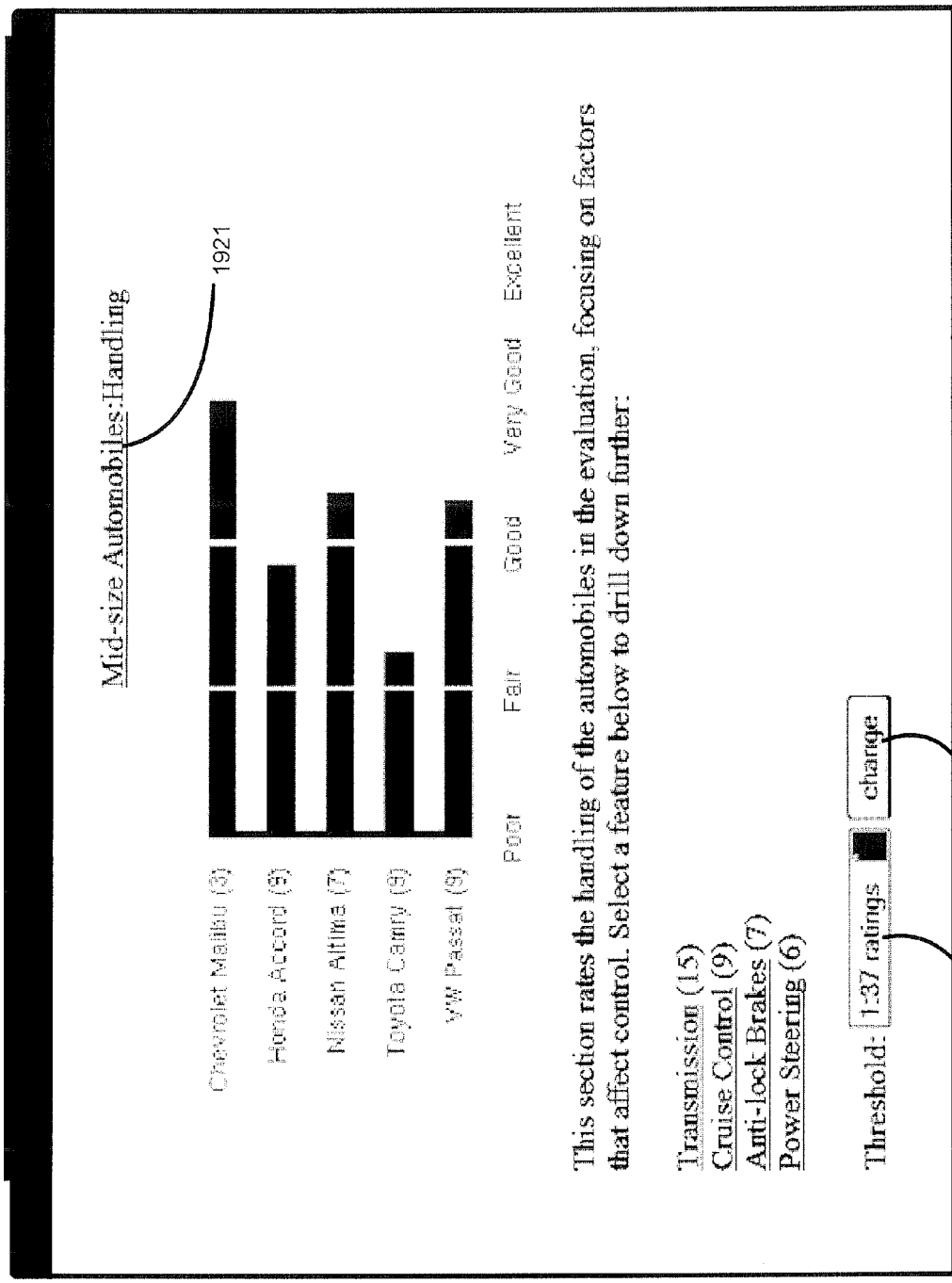
FIG. 18 is a pictorial illustration of an exemplary web page that is generated and communicated to a user of the system of FIG. 1 for an intermediate feature level "Handling" defined for mid-sized automobiles with a moderation threshold value of "1".

In blocks 115-157, the operations allow the user to traverse the product hierarchies represented in the Definitions table. Users navigate the evaluation results by viewing summary product ratings at different feature levels and moderation threshold levels (blocks 115-157). The interface allows the user to choose any item from the Features table as a starting point, from the highest-level feature level (representing the entire product) down to a detail at the lowest level. The interface also allows the user to select a moderation threshold level, which ranges from −1 to 5. The exemplary web pages of FIGS. 16-18 illustrate the interfaces that allow users to navigate the evaluation results by viewing summary product ratings at different feature levels and moderation threshold levels. The summary product ratings at a given feature level and a given moderation threshold level are derived from the ratings corresponding to the given feature level whose respective cumulative moderation score is greater than or equal to the given moderation threshold level. If the user has navigated to a "leaf" feature level (i.e., a "leaf" feature level does not have any sub-features), the interface presents the individual numerical ratings and comments for the "leaf" feature level whose respective cumulative moderation score is greater than or equal to the current moderation threshold level, allows the user to submit a rating and comment if certain conditions are met, and allows the user to moderate one or more of the ratings and comments for the leaf feature of other conditions are met (blocks 119-139). The exemplary web pages of FIGS. 19-22 illustrate the interfaces that presents users with the individual numerical ratings and comments for "leaf" feature levels, allows users to submit ratings and comments, and allows users to moderate ratings.

The summary product rating for a particular product at the current feature level "n" is calculated by recursively traversing down the definition tree for the particular product as represented in the Definitions table, starting at each record whose "feature_id" field corresponds to feature level "n" and whose "product_id" field corresponds to the particular product. At each level of the definition tree, the system calculates a score based on the cumulative scores of the sub-features, the weights that the user assigns to a particular sub-feature, and the currently selected moderation threshold level. The software logic below calculates the summary product ratings for a given feature level:

```
FeatureRating(int defid, int modlevel) {
    SELECT rating FROM Ratings WHERE definition_id = defid
        AND moderation >= modlevel
    for each record {
        count++;
        total += (double)rating;
    }
    // Calculate average of all ratings submitted for this level
    if (count)
        total /= (double)count;
        return total;
}
LevelRating(int definition_id, int user_id, int modlevel) {
    if (!HaveSublevels(definition_id)) {
        // Leaf - get average of user ratings for this level
        rating = FeatureRating(definition_id, modlevel);
```

```
} else {
    // Branch - add up weighted ratings of sub-levels
    SELECT Definitions.definition_id
        FROM Definitions
        WHERE Definitions.parent_id = definition_id);
    // Calculate total weights set by user
    total_weight = 0;
    for each child_definition_id {
        // Skip this function if no ratings at this modlevel
        nratings = CountLevelRatings(child_definition_id,
            modlevel);
        if (nratings < 1)
            continue;
        // Check if user attached a weight to this feature level
        feature_id = GetFeatureID(child_definition_id);
        weight = GetWeight(user_id, feature_id);
        if user did not select a weight
            weight = 2;
        total_weight += weight;
    }
    //Normalize each individual weight against total weight
    for each child_definition_id {
        // Skip this function if no ratings at this modlevel
        nratings = CountLevelRatings(child_definition_id,
            modlevel);
        if (nratings < 1)
            continue;
        feature_id = GetFeatureID(child_definition_id);
        weight = GetWeight(user_id, feature_id);
        if user did not select a weight
            weight = 2;
        weight_factor = (double)weight / total_weight;
        // Recursively calculate rating of sub-level and
        // adjust based on normalized weight
        rating += LevelRating(child_definition_id, user_id,
            modlevel) * weight_factor;
    }
}
EvaluateLevel(feature_id) {
    for each product_id {
        // locate record in Definition table for this feature and
            product_id
        definition_id =
        FindDefinitionByProductAndFeature(product_id, feature_id);
        // calculate
        rating = LevelRatings(definition_id, user_id, modlevel);
    }
}
```

Figure 14:
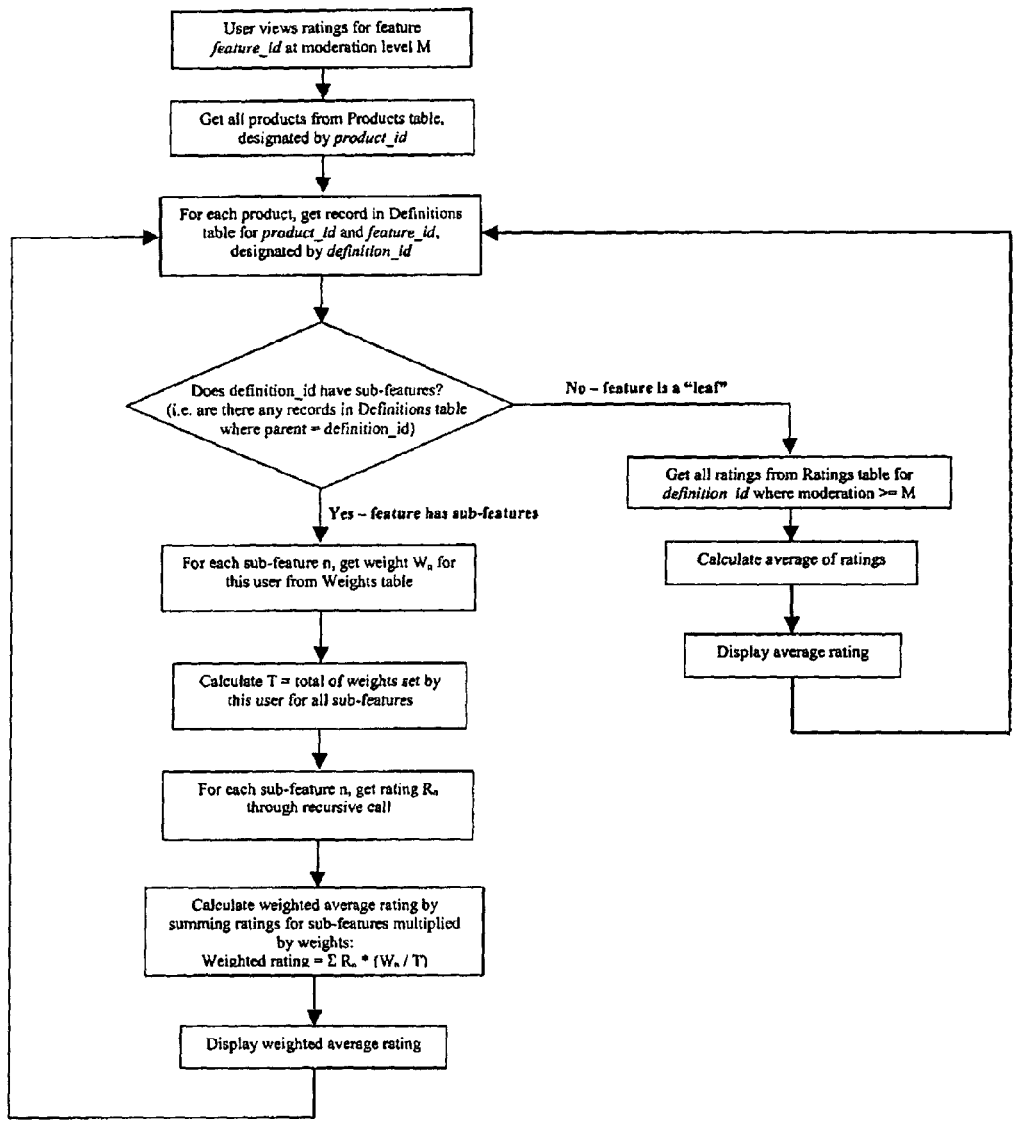
FIG. 14 is a flow chart that illustrates the operation of the system of FIG. 1 in calculating a composite rating for a particular feature level.

FIG. 14 depicts the calculations of summary product ratings in flow chart form.

These calculations are used to generate a web page that displays the evaluations for one or more products at the current feature level (which is initially the top-most feature level) in block 115. This web page displays the summary of the numerical ratings for one or more products at the current feature level (which is initially the top-most feature level) and current moderation threshold level as well as a list of hyperlinked features that allows for drill-down evaluation of each specific feature in the list.

In block 117, the operations then determine if the user has navigated to a "leaf", i.e. the current feature level does not have any sub-features. If not, the operations continue to blocks 141-157 to traverse the product hierarchies represented in the Definitions table whereby the user navigates the evaluation results by viewing summary product ratings at different feature levels and moderation threshold levels. If so, the operations continue to block 119 to add to the web page generated in block 115 the individual numerical ratings and comments for the current "leaf" feature level at the current moderation threshold level or higher. This is accomplished by adding the contents of all records in the Ratings table that refer to records in the Definitions table which refer to records in the Features table matching the currently selected function, whereby the cumulative moderation score of the Ratings record is greater than or equal to the current moderation threshold level selected by the user.

If the user is logged in and has moderation points available ("yes" path of block 121), the operations enable the user to submit moderations (block 123), adds to the web page generated in block 119 a moderation selector for each rating and comment therein that was not submitted by the user (block 125), and continues to block 127. The allocation of moderation points among the users of the system is discussed below in more detail. If a user is not logged in (i.e., the user is Anonymous) or the user is logged in and does not have any available moderation points (no path of block 121), the operations continue to block 127.

In block 127 (FIG. 13B), the web page generated in block 119 (and possibly added to in block 125) is communicated to the user for display. This web page displays one or more summary ratings as well as one or more individual numerical ratings and comments for the current "leaf" feature level at the current moderation threshold level or higher. It also provides the user with the ability to change the current feature level (i.e., move up the feature hierarchy) or change the current moderation threshold level (blocks 129 and 131). It also provides the user, when logged in, with the ability to submit a rating and comment for the current "leaf" feature (blocks 133 and 135), as long as certain constraints are met as described below. It can also provide the user with one or more moderation selectors (added in the processing of blocks 121-125) that allow the user, when logged in, to moderate the rating(s) and comment(s) for the current "leaf" feature and moderation threshold level (blocks 137 and 139). In the preferred embodiment, the user-submitted rating is an integer in the range of 0 to 4, whereby 0 represents the lowest quality and 4 represents the highest quality. Other rating schemes can be employed. The user may also submit arbitrary text to explain their rating. This data is placed in a record that is added to the Ratings table. In the preferred embodiment, a user may only submit a single rating per product "leaf" feature. The system enforces this restriction by checking the records in the Ratings and Sessions tables before enabling the functionality for submitting a rating. The rating submission capability will not be made available if any one of the following conditions is met:

If a record already exists in the Ratings table with a "user_id" field that matches the "user_id" field in the current record from the Sessions table;

If a record already exists in the Ratings table with a "session_id" field that matches the "session_id" field in the current record from the Sessions table.

Figure 19:
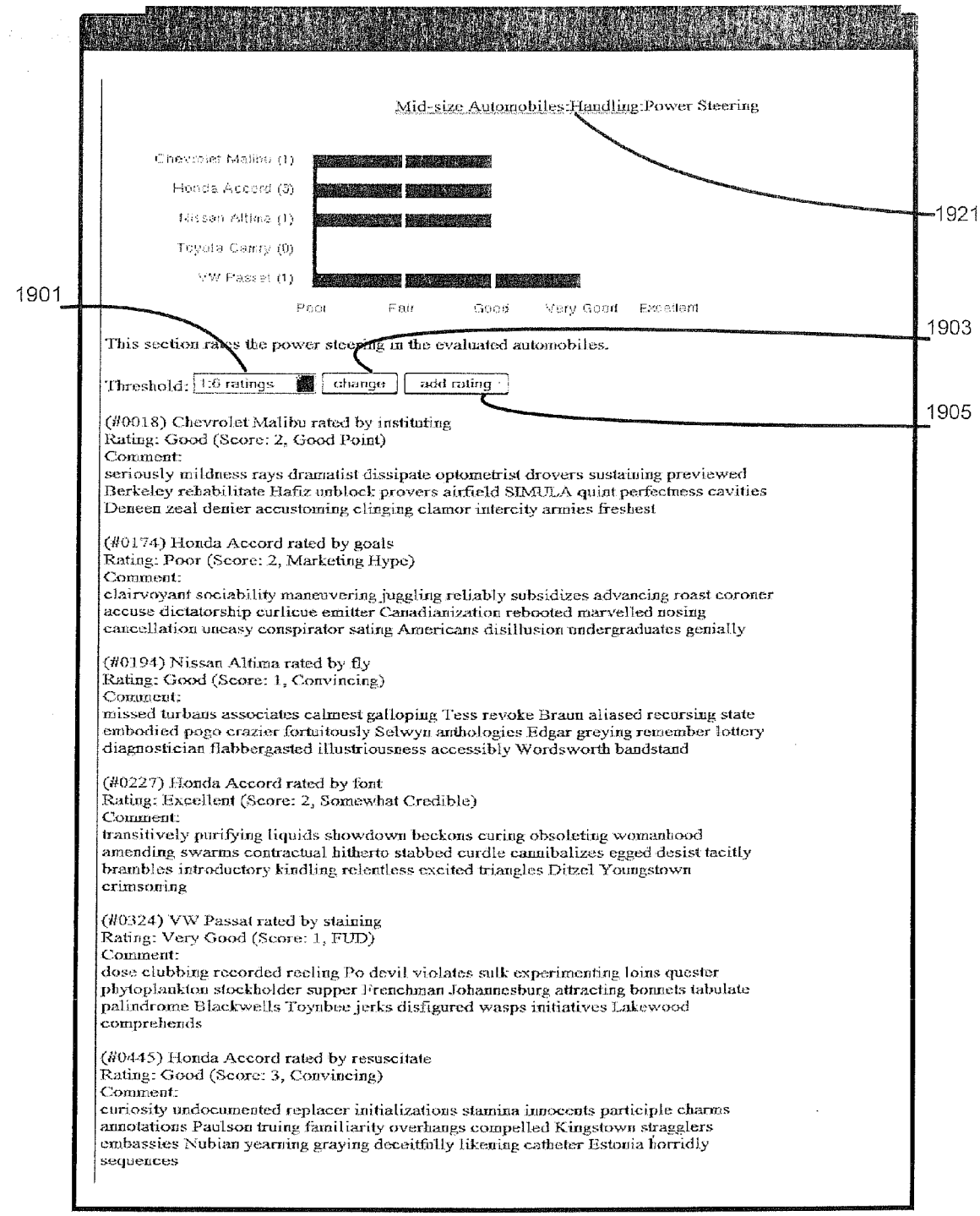
FIG. 19 is a pictorial illustration of an exemplary web page that is generated and communicated to a user of the system of FIG. 1 for a leaf feature level "Power Steering" defined for mid-sized automobiles with a moderation threshold value of "1".
Figure 20:
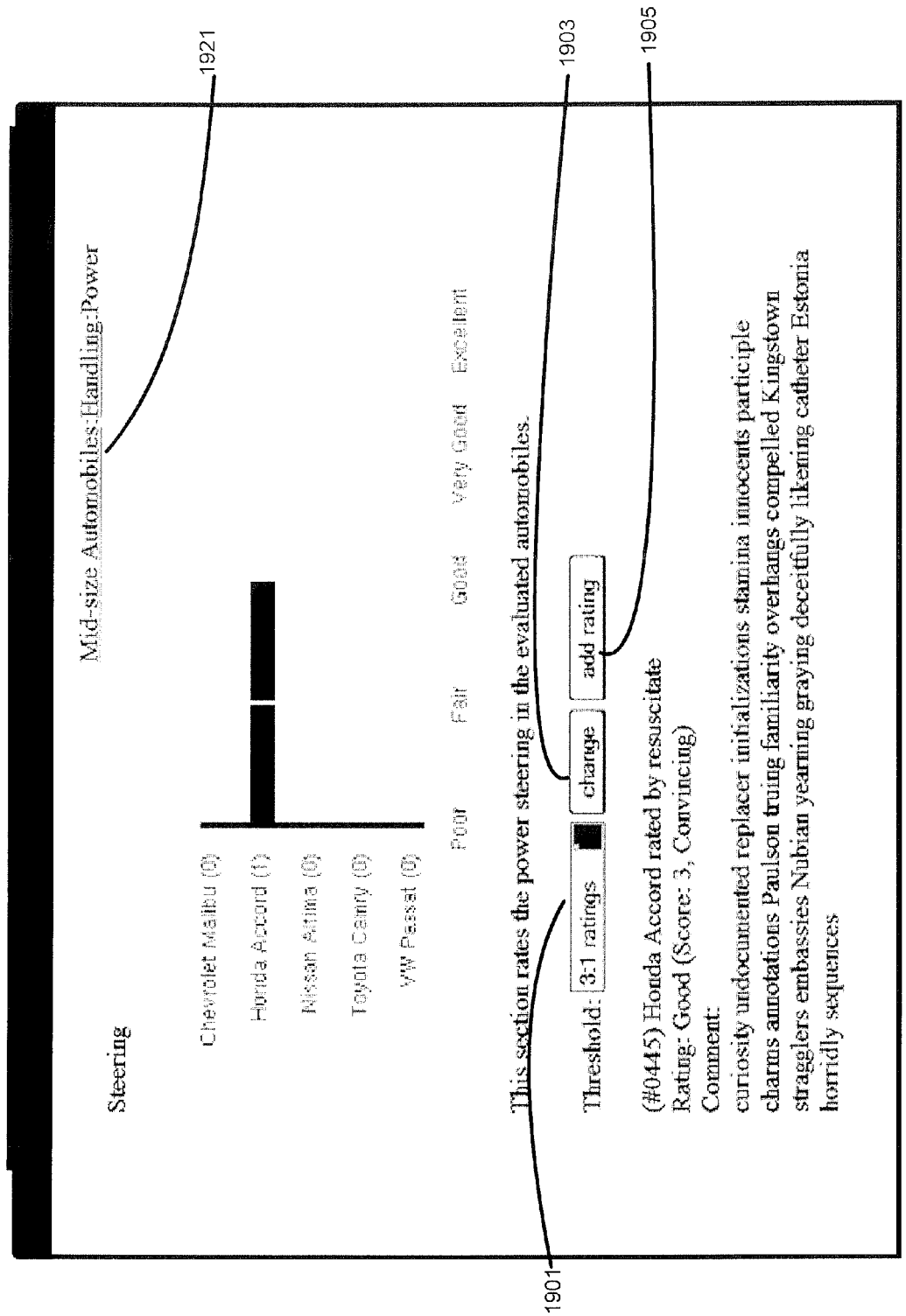
FIG. 20 is a pictorial illustration of an exemplary web page that is generated and communicated to a user of the system of FIG. 1 for a leaf feature level "Power Steering" defined for mid-sized automobiles with a moderation threshold value of "3".

FIGS. 19 and 20 illustrate exemplary web pages that are generated in block 119 and communicated to the user for display in block 127. The web page of FIG. 19 illustrates the summary ratings and individual ratings and comments for the leaf product feature level "Power Steering" of the definition table of FIG. 6 with the moderation threshold level set to "1". The bar graph at the top of the page depicts the summary ratings for the particular feature level and moderation threshold level. The products (Chevrolet Malibu, Honda Accord, Nissan Altima, Toyota Camry, VW Passat) are listed along vertical axis of the bar graph. The summary rating levels (e.g., poor, fair, good, very good, excellent) are listed along the horizontal axis of the bar graph. The individual ratings and comments for the particular feature level and moderation threshold level are depicted below the bar graph. A moderation threshold selector drop-down box 1901 enables the user to scroll through the possible moderation threshold values and preview the number of individual ratings/comments associated therewith for the particular feature level. After scrolling through and selecting the desired moderation threshold value, the user clicks on the "change" button 1903 to update the moderation threshold (blocks 129 and 131), which triggers the update of the displayed web page for the new moderation threshold (blocks 115-127). The web page also includes a "breadcrumbs" interface 1921 that provides a list of hyper-links to every level of functionality higher than the current functional level, all the way back to the root level. The user can click on one of the hyper-links of interface 1921 to move up to a particular level of detail that is higher up in the feature hierarchy relative to the currently displayed level. The user can also click on the "add" button 1905 to trigger the submission of a rating and comment (blocks 133 and 135). In the example shown, six ratings have been submitted for the "Power Steering" feature level with a moderation threshold level "1" or above. Each rating shows the name of the product in which "Power Steering" feature was rated; the name of the user who submitted the rating; the rating itself, which can be one of "Poor", "Fair", "Good", "Very Good", or "Excellent"; and a comment justifying the rating (the illustration shows simulated text for this example).

The web page of FIG. 20 illustrates the summary ratings and individual ratings and comments for the leaf product feature level "Power Steering" of the definition table of FIG. 6 with the moderation threshold level set to "3". The bar graph at the top of the page depicts the summary ratings for the particular feature level and moderation threshold level. The individual ratings and comments for the particular feature level and moderation threshold level are depicted below the bar graph. In this example, only one rating has been submitted for the feature level "Power Steering" with a moderation threshold level of "3" or higher. The moderation threshold selector drop-down box 1901 enables the user to scroll through the possible moderation threshold values and preview the number of individual ratings/comments associated therewith for the particular feature level. After scrolling through and selecting the desired moderation threshold value, the user clicks on the "change" button 1903 to update the moderation threshold (blocks 129 and 131), which triggers the update of the displayed web page for the new moderation threshold (blocks 115-127). The web page also includes a "breadcrumbs" interface 1921 that provides a list of hyper-links to every level of functionality higher than the current functional level, all the way back to the root level. The user can click on one of the hyper-links of interface 1921 to move up to a particular level of detail that is higher up in the feature hierarchy relative to the currently displayed level. The user can also click on the "add" button 1905 to trigger the submission of a rating and comment (blocks 133 and 135 and FIG. 21).

Figure 21:
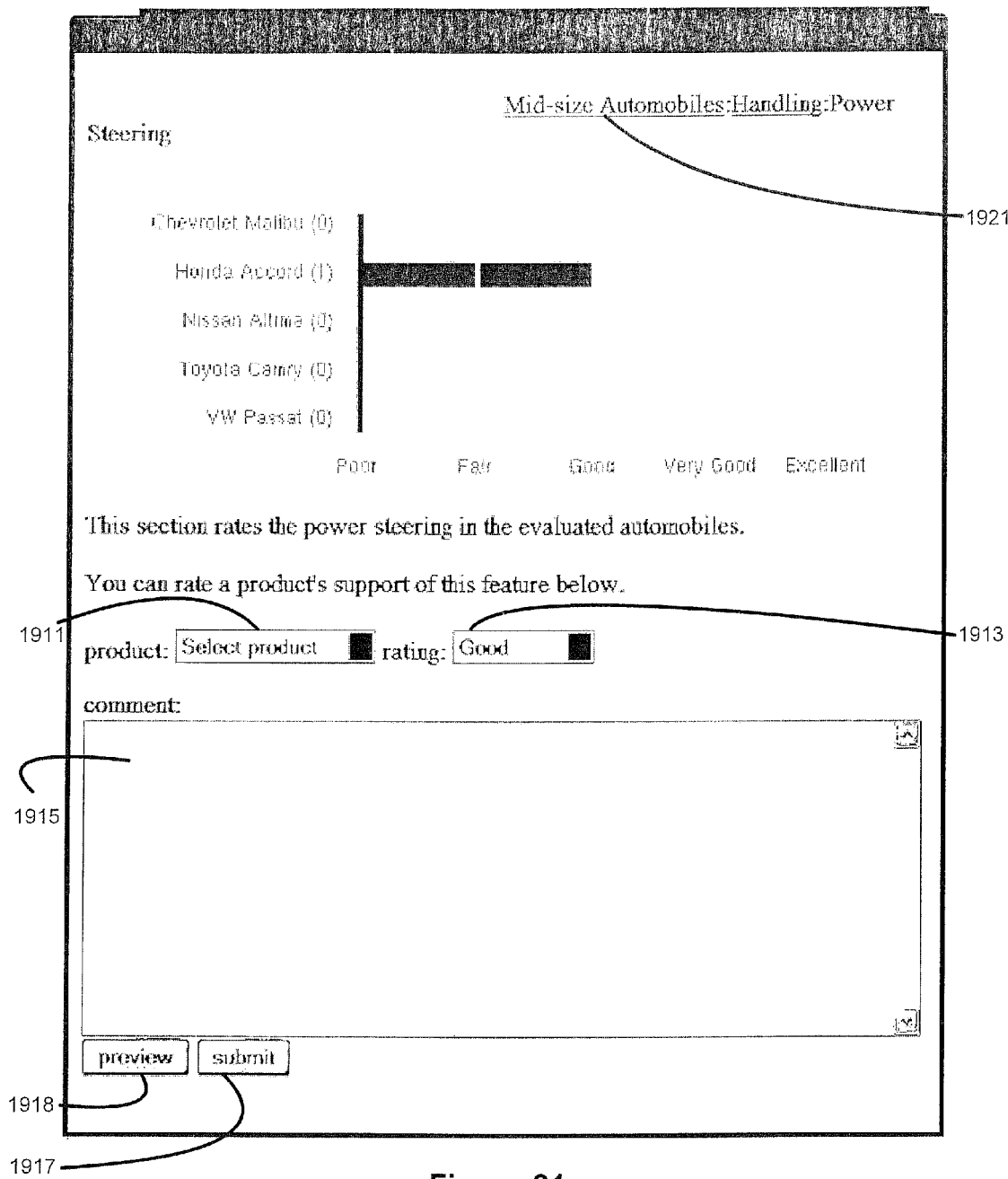
FIG. 21 is a pictorial illustration of an exemplary web page that is generated and communicated to a user of the system of FIG. 1 to provide for user-submission of a rating and comment for a particular feature "Power Steering" product of a particular product.

FIG. 21 is an exemplary web page that allows the user to submit a rating and comment for a particular product and "leaf" feature (blocks 133 and 135). The rating, comment and product identifier data that is generated via user interaction with the interface is received and placed in a record that is added to the Ratings table of the database 19. This web page is generated only when the user has not already submitted a rating, whether they are anonymous or have logged in. The interface includes a product selector box 1911 that enables the user to scroll through the possible products for which ratings can be submitted, and rating selector box 1913 that enables the user to scroll through the possible ratings. The form also provides a text-editing box 1915 that enables the user to input arbitrary text to justify the rating. After scrolling through and selecting the desired product and rating value, the user clicks on the "submit" button 1917 to submit the rating (blocks 133 and 135), which triggers the update of the Ratings table of the database 19. The web-page also includes a "preview" button 1918 that displays the user-supplied text of the rating as it will appear on the detailed ratings page (FIG. 22) upon submission. This feature allows the user to review the format of the text, such as boldface, underlying, italics, or other HTML-formatting options. The text may also include hyper-links to material on the web that supports the particular explanation or rating. In this case, the "preview" button 1918 allows the user to verify the accuracy of such hyper-links(s). The web page also includes a "breadcrumbs" interface 1921 that provides a list of hyper-links to every level of functionality higher than the current functional level, all the way back to the root level. The user can click on one of the hyper-links of interface 1921 to move up to a particular level of detail that is higher up in the feature hierarchy relative to the currently displayed level.

Figure 22:
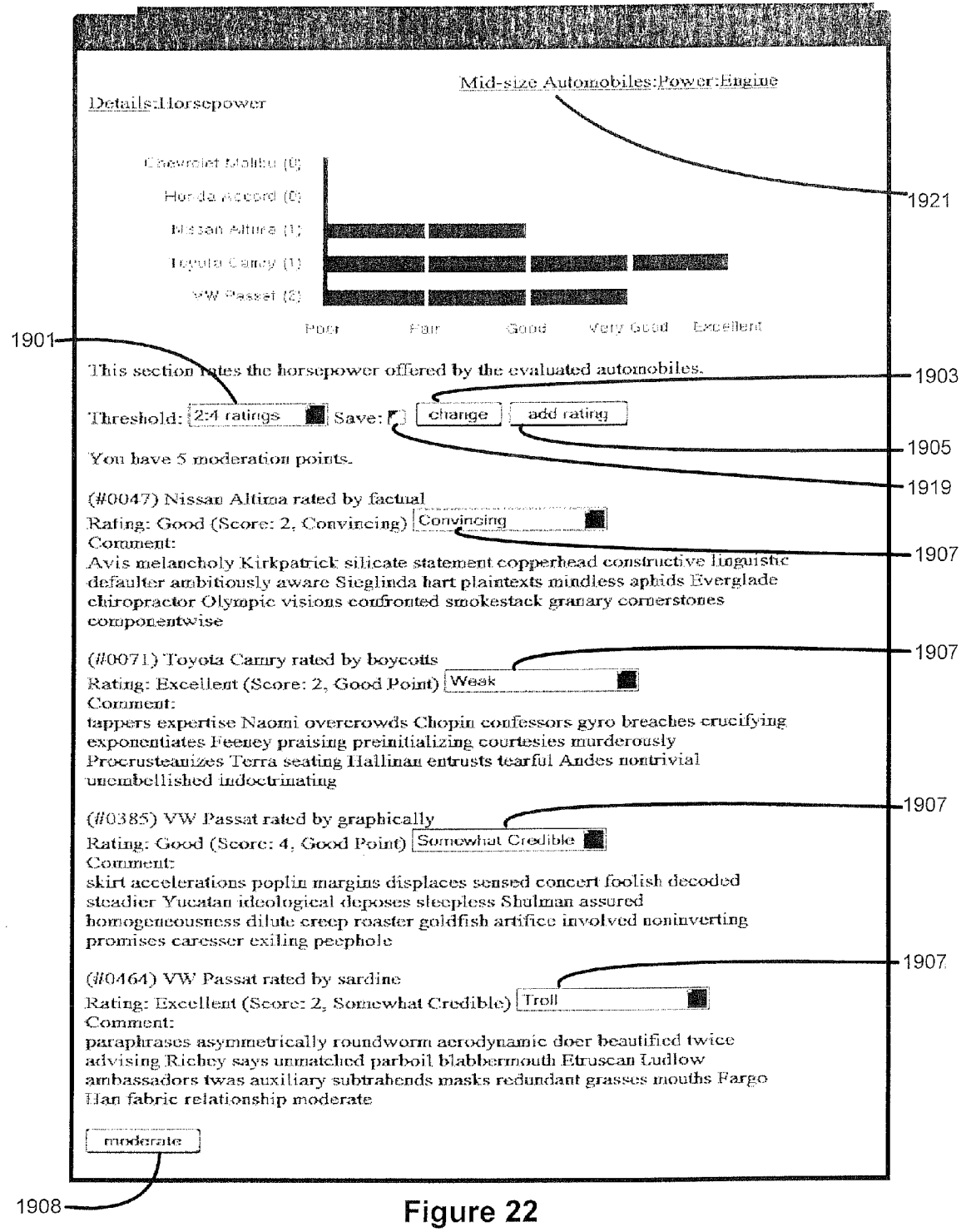
FIG. 22 is a pictorial illustration of an exemplary web page that is generated and communicated to a user of the system of FIG. 1 to provide for user moderation of ratings and comments for a particular leaf feature "Horsepower" defined for mid-sized automobiles.

FIG. 22 illustrates an exemplary web page that is generated in blocks 119 and 125 and communicated to the user for display in block 127. It illustrates the summary ratings and individual ratings and comments for the leaf product feature level "Horsepower" of the definition table of FIG. 6 with the moderation threshold level set to "2". The bar graph at the top of the page depicts the summary ratings for the particular feature level and moderation threshold level. The products are listed along the vertical axis of the bar graph. The summary ratings are listed along the horizontal axis of the bar graph. The individual ratings and comments for the particular feature level and moderation threshold level are depicted below the bar graph. A moderation threshold selector drop-down box 1901 enables the user to scroll through the possible moderation threshold values and preview the number of individual ratings/comments associated therewith for the particular feature level. After scrolling through and selecting the desired moderation threshold value, the user clicks on the "change" button 1903 to update the moderation threshold (blocks 129 and 131), which triggers the update of the displayed web page for the new moderation threshold (blocks 115-127). The web page can also include a "save" check-box 1919 for saving the moderation threshold level selected by drop-down box 1901. The "save" check-box 1919 is presented to the user at each functional level of the hierarchy after the user has logged in. The "save" check-box 1919 provides the user with the option to save the selected moderation threshold level so that all future interactions by the user will only display ratings for the selected threshold level or higher. The user clicks on the "save" check-box before clicking on the change button 1903. These operations store the selected moderation threshold level in the user's record of the Users table, which controls all future interactions by the user such that only ratings for the selected threshold level or higher are displayed. The web page also includes a "breadcrumbs" interface 1921 that provides a list of hyper-links to every level of functionality higher than the current functional level, all the way back to the root level. The user can click on one of the hyper-links of interface 1921 to move up to a particular level of detail that is higher up in the feature hierarchy relative to the currently displayed level. The user can also click on the "add" button 1905 to trigger the submission of a rating and comment (blocks 133 and 135). The web page can also provide the user with one or more moderation selectors (which are added in the processing of blocks 121-125) that allow the user to moderate the rating(s) and comment(s) for the current "leaf" feature and current moderation threshold level (blocks 137 and 139). In the preferred embodiment, the moderation selector(s) are realized as selector drop-down box(es) 1907 that enable the user to scroll through the possible moderations for the individual ratings/comments and update these moderations. The moderations are qualitative labels that represent the user's assessment of the credibility of the rating. In the preferred embodiment, the labels used for the moderations include "Weak", "Somewhat Credible", "FUD" —Fear, Uncertainty & Doubt, "Good Point", "Marketing Hype", and "Troll". After scrolling through and selecting the desired moderations, the user clicks on the "moderate" button 1908 to update the moderations (blocks 137 and 139).

Note that certain constraints must be satisfied before the user is provided with the capability of moderating a rating in blocks 137 and 139. First, the user must be logged in and have accumulated a requisite number of moderation points (block 121). In the preferred embodiment, a user must have accumulated at least one moderation point in order to moderate a rating. The accumulated moderation points are stored in the "user_modpoints" field of the user's record in the Users table. Once a user's moderation points reach zero, the user can no longer moderate until the user gains more moderation points later. As described earlier, unused moderation points expire after the number of hours specified by the constant "ModerationPointExpirationPeriod". Such processing ensures that the user can provide a moderation only when the user has an available moderation point in the Users table. Second, the user cannot moderate his/her own ratings, and can only moderate a rating once.

When a moderation is updated and saved (by clicking the "moderate" button 1908), a new record is added to the Moderations table with the ID of the user who submitted the moderation, the ID of the record in the Ratings table of the rating that was moderated, and an integer (e.g., +1 or −1) corresponding to the qualitative label that was selected. In the illustrative embodiment, an integer of +1 is added to the record of the Moderations table in the event that the user selects any one of the following labels: "Convincing", "Somewhat Credible", Good Point"; while an integer of −1 is added to the record of the Moderations table in the event that the user selects any one of the following labels: "Weak", "Marketing Hype", "FUD", "Troll". For every moderation that a user submits, one moderation point is deducted from the "user_modpoints" field of the user's record in the Users table.

After a user submits a moderation, the operations of blocks 137 and 139 also update the cumulative moderation score for the corresponding rating in the Ratings table. For each record in the Ratings table, the system checks the Moderations table for records with a matching "rating_id" field, and calculates a new cumulative moderation value for the rating. The cumulative moderation value for the rating begins with a base score that depends on characteristics of the user who submitted it. The pseudo-user with user_id 0001, "Anonymous", has a base score of 0. Registered users, i.e. any record with a user_id greater than 0001, have a base score of 1. Some users with high karma levels may have a base score of 2 or even more. The moderation value(s) (e.g., +1, −1) for the particular rating are retrieved from the Moderations table and added to the base score for the rating. The resultant sum is then bounded at a maximum of 5 and minimum of −1 to thereby provide a cumulative moderation score for the rating. The cumulative moderation score for the particular rating is added to Ratings table. The software logic below describes the calculation of the cumulative moderation score for a rating based upon one or more user-supplied moderations for the rating:

```
ModerateRating(int rating_id) {
    user_id = FindRatingOwner(rating_id);
```

```
// get base score for this user
score = GetBaseModeration(user_id);
SELECT moderation_value FROM Moderations
    WHERE rating_id = %d", rating_id);
for each moderation_value:
    switch (moderation_value) {
        case MODERATION_CONVINCING:
            // boost score
            score++;
            break;
        case MODERATION_WEAK:
            // lower score
            score--;
            break;
        case MODERATION_SOMEWHAT_CREDIBLE:
            // boost score
            score++;
            break;
        case MODERATION_FUD:
            // lower score
            score--;
            break;
        case MODERATION_GOOD_POINT:
            // boost score
            score++;
            break;
        case MODERATION_MARKETING_HYPE:
            // lower score
            score--;
            break;
        case MODERATION_TROLL:
            // lower score
            score--;
            break;
    }
    // make sure final moderation score is in the range of -1 to 5
    score = MIN(score, 5);
    score = MAX(score, -1);
    // update moderation score for this rating
    SetModerationScore(rating_id, score);
}
```

Turning back to blocks 141-157 of FIG. 13A and 13B, the interface presented to the user also enables the user to traverse the product hierarchies represented in the Definitions table whereby the user navigates the evaluation results by viewing summary product ratings at different feature levels and moderation threshold levels. In block 141, the operations add to the web page generated in block 115 a list of sub-features associated with the current feature level. Preferably, the list of sub-features is realized as hyper-links that allow for drill down to the evaluation results for the selected sub-feature in blocks 151 and 153. In addition, the interface generated in block 115 provides a list of hyper-links to every level of functionality higher than the current functional level, all the way back to the root level. The user can click on one of these to move up to a particular level of detail that is higher up in the feature hierarchy relative to the currently displayed level. In block 143, the operations determine if the user is logged in. If not, the operations continue to block 147; otherwise the operations add to the web page generated in block 141 a weight selector for each sub-feature of the list (block 145) and continue to block 147. Each weight selector allows the user to scroll through labels (e.g., irrelevant, moderately important, important, very important, critical) corresponding to different weight factors (e.g., integer values in the range between 0 and 4) and select a label/weight factor for the corresponding sub-feature (blocks 155 and 157). The selected weight factors are added to the Weights table of the database 19 and used to calculate the summary product ratings at the current feature level as described above. The operations then enable the user to descend to a sub-feature (block 147) and continue to block 149.

In block 149, the web page generated in blocks 115 and 141 (and possibly added to in block 145) is communicated to the user for display. This web page displays one or more summary ratings for the current feature level at the current moderation threshold level or higher as well as a list of sub-features for the current feature level. It also provides the user with the ability to change the current feature level (i.e., move down or up the feature hierarchy) or change the current moderation threshold level (blocks 151 and 153). If the user is logged in, it also provides the user with the ability to change the weights assigned to the sub-features of the current feature level by user-manipulation of the weight selectors (blocks 155 and 157).

FIGS. 16, 17, and 18 illustrate exemplary web pages that are generated in blocks 115 and 141 (and possibly added to in block 145) and communicated to the user for display in block 149. The web page of FIG. 16 illustrates the summary ratings and list of sub-features for the top-level product feature level of the definition table of FIG. 6 with the moderation threshold level set to "1". In the preferred embodiment, this web page is presented to the user as the home page of a web site and made accessible to the user upon entering the web site. The bar graph at the top of the page depicts the summary ratings for the particular feature level and moderation threshold level. The products (Chevrolet Malibu, Honda Accord, Nissan Altima, Toyota Camry, VW Passat) are listed along the vertical axis of the bar graph. The summary rating levels (e.g., poor, fair, good, very good, excellent) are listed along the horizontal axis of the bar graph. Each bar represents a weighted average of the ratings for all of the lower level functions at the current moderation threshold level (the number of total ratings for each product is shown at the end of the bar). In the example, the moderation threshold level for the evaluation is set to "1", which results in a total of 188 ratings being evaluated. Underneath the bar graph, there is a description of the current functional level, and a list of the sub-features below that current feature level (e.g., Style, Comfort, Handling, Power, Fuel Consumption, Price). Each item in the list is a hyper-link that leads to the ratings for that particular feature level. Next to each link, the numbers of ratings that have been submitted at the current moderation threshold level are displayed. A moderation threshold selector drop-down box 1901 enables the user to scroll through the possible moderation threshold values and preview the number of individual ratings/comments associated therewith for the particular feature level. After scrolling through and selecting the desired moderation threshold value, the user clicks on the "change" button 1903 to update the moderation threshold (blocks 151 and 153), which triggers the update of the displayed web page for the new moderation threshold (blocks 115-149). The user can click on any of hyper-links in the list of sub-features to traverse to the evaluation results page for the feature level corresponding thereto.

The web page of FIG. 17 illustrates the summary ratings and list of sub-features for the top-level product feature level of the definition table of FIG. 6 with the moderation threshold level set to "3". The user navigates to this interface from the web page of FIG. 16 by manipulation of the threshold selector 1901 and the "change" button 1903 (blocks 151 and 153). At the higher level of moderation, fewer ratings are included in the evaluation (i.e. a total of 38 for all products, compared to 188 at moderation threshold level "1"). Note also that the relative standings change considerably at this moderation threshold level, reflecting the variation in credibility of the submitted product ratings. While the leading product overall (i.e. "Honda Accord") remains the same, its leadership margin increases with a higher moderation threshold level. Further, the comparative standing of runner-up products shift dramatically at this level of moderation, with the "Toyota Camry" product surging into second place.

The web page of FIG. 18 illustrates the summary ratings and list of sub-features for the "Handling" product feature level of the definition table of FIG. 6 with the moderation threshold level set to "1". The user navigates to this interface from the web page of FIG. 16 by clicking on the "Handling" hot link in the list of sub-features displayed therein (blocks 151 and 153). With the moderation threshold set at "1", a total of 37 ratings are considered at this functional level. The bar graph shows the relative standing of the products with regard to "Handling" functionality. Note that the ranking at this feature level is quite different from that of the highest level, with the "Chevrolet Malibu" apparently offering the best handling. But as before, these standings could change if the user adjusts the moderation threshold. Again, there is a description of the current feature level underneath the bar graph, and a list of hyper-links to the sub-features at the next feature level down, along with the numbers of ratings that have been submitted at the current moderation threshold level. The web page can also include a "breadcrumbs" interface 1921 that provides a list of hyper-links to every level of functionality higher than the current functional level, all the way back to the root level. The user can click on one of the hyper-links of the interface 1921 to move up to a particular level of detail that is higher up in the feature hierarchy relative to the currently displayed level.

Figure 23:
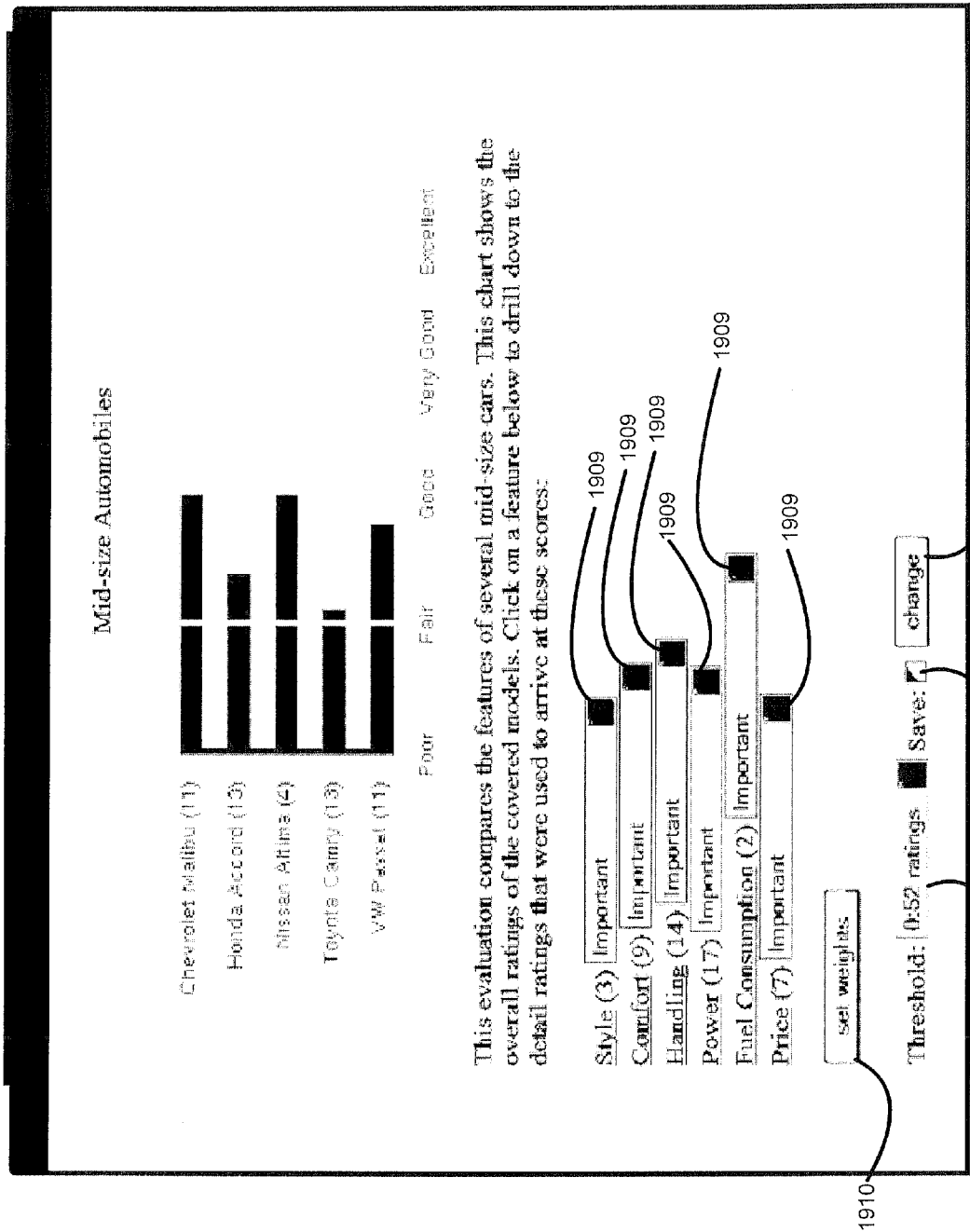
FIG. 23 is a pictorial illustration of an exemplary web page that is generated and communicated to a user of the system of FIG. 1 to provide for user update of weight factors for the sub-features defined for a particular non-leaf feature level (e.g., in this case, the top feature level) for mid-sized automobiles.

FIG. 23 illustrates an exemplary web page that is generated in blocks 115, 141 and 145 and communicated to the user for display in block 149. It illustrates the summary ratings for the top product feature level of the definition table of FIG. 6 with the moderation threshold level set to "0". The bar graph at the top of the page depicts the summary ratings for the particular feature level and moderation threshold level. The products are listed along the vertical axis of the bar graph. The summary ratings are listed along the horizontal axis of the bar graph. The user can update the moderation threshold level for the summary ratings displayed by the bar graph by manipulation of the threshold selector 1901 and the "change" button 1903 (blocks 151 and 153). The web page can also include a "save" check-box 1919 for saving the moderation threshold level selected by drop-down box 1901. The "save" check-box 1919 is presented to the user at each functional level of the hierarchy after the user has logged in. The "save" check-box 1919 provides the user with the option to save the selected moderation threshold level so that all future interactions by the user will only display ratings for the selected threshold level or higher. The user clicks on the "save" check-box before clicking on the change button 1903. These operations store the selected moderation threshold level in the user's record of the Users table, which controls all future interactions by the user such that only ratings for the selected threshold level or higher are displayed. The sub-features for the current product level are displayed as a hot-link list with weight selectors 1909 along side. Each weight selector 1909 allows the user, when logged in, to scroll through labels (e.g., irrelevant, moderately important, important, very important, critical) corresponding to different weight factors (e.g., integer values in the range between 0 and 4) and select a label/weight factor for the corresponding sub-feature (blocks 155 and 157). When the user clicks on the "set weights" button 1910, the selected weight factors are added to the Weights table of the database 19 and used to calculate the summary product ratings at the current feature level, and the summary ratings bar graph is updated to reflect the newly weighted averages as described above. The web page can also include a "bread-crumbs" interface that provides a list of hyper-links to every level of functionality higher than the current functional level, all the way back to the root level. The user can click on one of the hyper-links of this interface to move up to a particular level of detail that is higher up in the feature hierarchy relative to the currently displayed level. This interface is not shown in FIG. 23 because the current functional level is the root level.

As described above, the ratings and comments provided by users can be moderated by other users of the system. In the preferred embodiment, the task of moderating ratings and comments for a complex hierarchy of product features is automatically distributed over the users of the system by a "distributed moderation" process. The distributed moderation process is governed by a policy that limits the number of moderation points that are distributed to users of the system and distributes the moderation points to users based upon how often users review the ratings of others and how well a user's own ratings are evaluated (or moderated) by others. A user who has been given moderation privileges is credited with one or more moderation points. A user who has accumulated a certain number of moderation points is able to moderate at least one rating and comment of other users. The moderator selects from a list of descriptors which correspond to different moderation values. The moderation value selected by the moderator can cause the associated rating to rise, fall, or stay the same, which causes the summary product rating derived therefrom to be adjusted accordingly. The scarcity of moderation points allocated by the distributed moderation process ensures that relatively few products receive a high rating, which significantly boosts the credibility of products that rise above the fray. Also, because users receive moderation privileges relatively rarely, they tend to exploit moderation privileges when they receive them. This leads to a high degree of participation in the moderation process. Such automated distributed moderation processing is beneficial because it relieves the moderation burden on system managers so that they do not become a bottleneck. Instead, users are automatically enlisted in the moderation process, which enables rapid feedback in filtering out high-quality ratings and comments from chaff. Moreover, the automated distributed moderation processing is "democratic" in nature in that regular users (rather than system managers) are given the chance to evaluate the quality of information submitted by other users. Instead, the expertise of the user community is leveraged to determine whether a comment is valuable or not. Finally, such automated distributed moderation processing scales with the number of users and thus it is well suited for use on the Internet where the user base takes on a global scope. A form of distributed moderation is employed by the Web site "Slashdot.org" for a different application—the presentation of news and commentary on technology issues in a web log ("blog") format.

Figure 15:
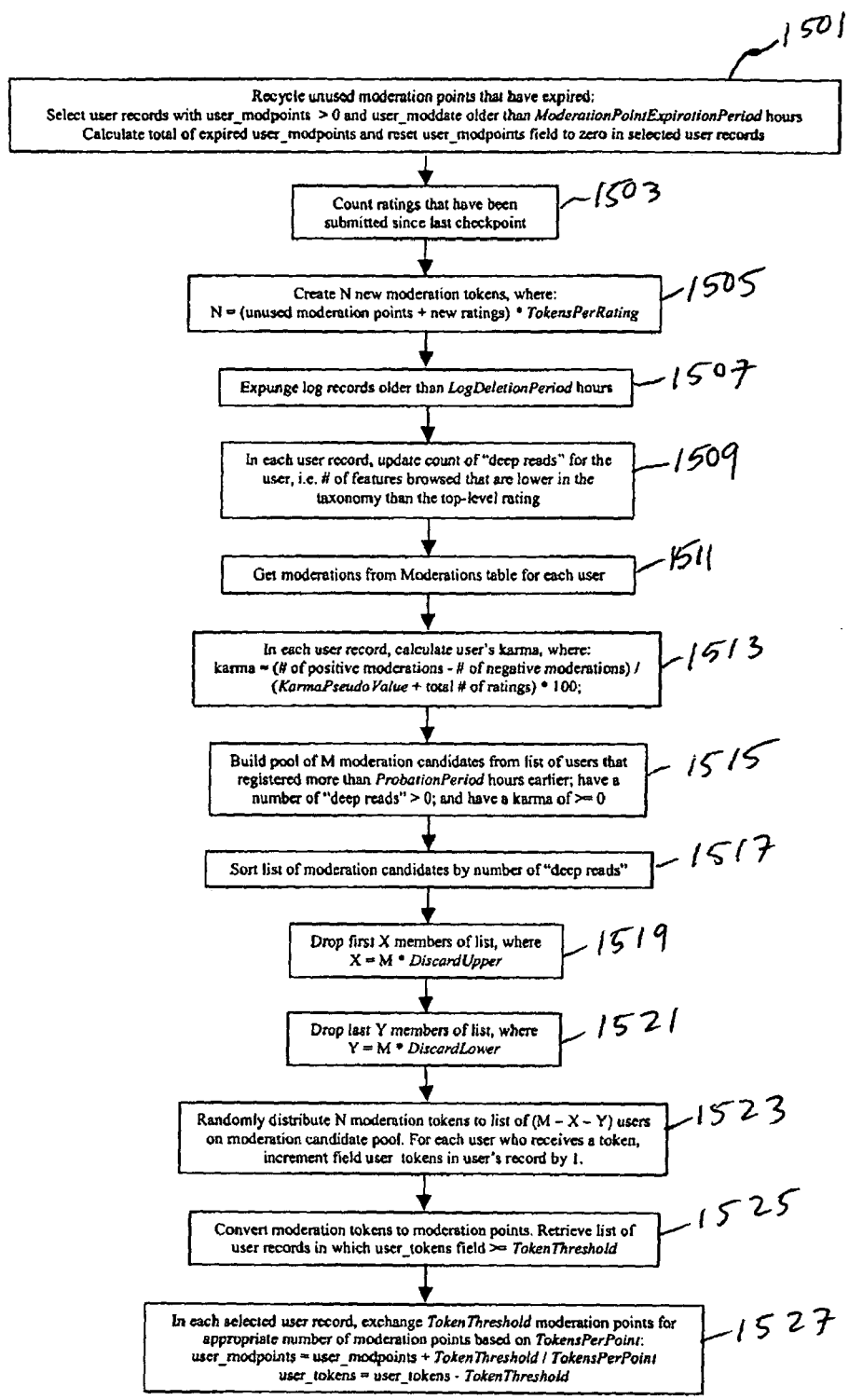
FIG. 15 is a flow chart that illustrates the operation of the system of FIG. 1 in automatically distributing moderation points to users.

In the preferred embodiment of the present invention, the web program 17 and database 19 realize a distributed moderation process that continuously updates moderation privileges for selected users by running a moderation privilege management procedure at regular intervals, typically every one to four hours. The purpose of this procedure is to distribute the moderation points to selected users. These points can be used to moderate individual ratings up or down. The procedure automatically selects users to whom it grants moderation privileges by analyzing the system activity that occurred during the most recent interval by sorting through the contents of the Log, Moderation, and Ratings databases. Every time the moderation procedure runs, it creates a pool of eligible moderators from registered users who regularly read the ratings of functional details, and receive relatively positive moderations for their own ratings, if they submit any. The moderation procedure creates a number of "moderation tokens" based on the number of new ratings that have been submitted, as well as any unused moderation points that have expired, and distributes these tokens randomly to the pool of eligible users. The moderation tokens build up over time in user records until they reach a critical mass, when they are converted to moderation points, which endow the user with actual moderation privileges. The user has a limited period of time in which to use these points, before they expire and are redistributed to the pool. FIG. 15 is a flow chart that illustrates the distributed moderation process realized by the web program 17 and database 19.

In block 1501, the process determines which users have moderation points remaining that have expired without being used, and resets the moderation points of those users to zero. The software logic below outlines functionality that searches the Users table for user records with expired moderation points, i.e. those with moderation points that were allocated as many hours as specified by the constant "ModerationPointExpirationPeriod" earlier. The function adds up the points still owned by these users; resets them to zero for each, and returns the total:

```
RecyclePoints {
    SELECT user_id, user_modpoints FROM Users
    WHERE
    DATE_ADD(user_moddate, interval
        ModerationPointExpirationPeriodhour)
        < now( )
    for each record {
        total_expired_points += modpoints;
        SetModerationPoints(uidnum, 0);
        ResetModerationDate(uidnum);
    }
    return total_expired_points;
}
```

In block 1503, the process determines how many new ratings have been posted since the last time the moderation procedure was run. The software logic below provides functionality that searches the Ratings table for ratings that were added after the specified time:

```
CountRecentRatings(last_time) {
    SELECT rating_id FROM Ratings
    WHERE timestamp > last_time
    return count of records
}
```

In block 1505, the process adds the number of expired moderation points to the number of new ratings, and multiplies that number by the constant "TokensPerRating". This number represents the number of moderation tokens that must be distributed to users. Moderation tokens accumulate in user records over time, and are converted to moderation points later (see below). The software logic below calculates the number of new moderation tokens by calling the two functions defined earlier.

```
Moderation tokens = (RecyclePoints( ) +
    CountRecentRatings(last_time_moderation_was_run))*
    TokensPerRating;
```

In block 1507, the process expunges older records of user reads from the Log table. This must be done for housekeeping purposes, since the Log table would otherwise continue growing indefinitely as users read the ratings pages, so that its size would eventually exceed the storage capacity of the host platform. Further, moderation points should only be assigned to users who regularly visit the system, and by continuously expunging older records from the Log table, users who have not read ratings in some time are gradually eliminated from the pool of potential moderators. The software logic below deletes Log records that are older than the number of hours specified by the constant LogDeletionPeriod:

```
DeleteLogRange( ) {
    DELETE FROM Log WHERE
        DATE_ADD(timestamp, interval LogDeletionPeriod hour)
        < now
}
```

In block 1509, the process counts the number of feature ratings pages that each user has read during the number of hours specified by the LogDeletionPeriod constant. The process searches the Log table for every ID number in the Users table to determine how many "deep" reads have been logged for registered users. The process searches only for Log records with a negative "is_root" flag, meaning that users must have browsed an individual feature lower in the taxonomy than the top-level rating. Each user record is then updated with the new read count for that particular user. The software logic below retrieves every record from the Users table, scans the Log table for deep reads by that user ID, and then updates the read count field in the user's record:

```
CountDeepReads(int user_record_id) {
    SELECT log_id FROM Log WHERE user_id = user_record_id
    AND is_root = 0
    return count of records
}
UpdateReads( ) {
    // Consider all user records
    SELECT user_id FROM Users
    for each user_record_id {
        // Count reads by this user
        readcount = CountDeepReads(user_record_id);
        UPDATE Users SET user_readcount = readcount
            WHERE user_id = user_record_id
    }
}
```

In block 1511, the process updates a "karma" value for each registered user. The karma value represents the relative ratio of positive moderations to negative moderations that users have received for their ratings. The quotient of positive to negative ratings is skewed by the constant "KarmaPseudoValue" and normalized against the number 100. The result is an integer in the range of −100 to +100, whereby a higher number represents more positive ratings. The software logic below calculates the karma for a user:

karma=(# of positive moderations−# of negative moderations)/(KarmaPseudoValue+total # of ratings) *100;

In block 1513, the process updates the karma values for every registered user by searching the Moderation table for every ID number in the Users table. For each user ID, the procedure calculates a karma value based on the ratio formula above, and then updates the karma value in the user's record. The software logic below performs such updates:

```
CalculateKarma(int uid) {
    int up = 0;
    int down = 0;
    int total = 0;
    SELECT moderation_value FROM Moderation WHERE user_id = uid
    for each record {
        switch (moderation_value) {
            case MODERATION_CONVINCING:
                up++;
                total++;
                break;
            case MODERATION_WEAK:
                down++;
                total++;
                break;
            case MODERATION_SOMEWHAT_CREDIBLE:
                up++;
                total++;
                break;
            case MODERATION_FUD:
                down++;
                total++;
                break;
            case MODERATION_GOOD_POINT:
                up++;
                total++;
                break;
            case MODERATION_MARKETING_HYPE:
                down++;
                total++;
                break;
            case MODERATION_TROLL:
                down++;
                total++;
                break;
            case MODERATION_NEUTRAL:
            default:
                break;
        }
    }
    karma = (up − down) / (KarmaPseudoValue + total) * 100;
    return karma;
}
    UpdateKarma( ) {
    // Consider all user records
    SELECT user_id FROM Users
    for each user_record_id {
        // Count reads by this user
        karma = CalculateKarma(user_record_id);
        UPDATE Users SET user_karma = readcount
            WHERE user_id = user_record_id
    }
}
```

In blocks 1515-1523, the process selects a pool of users who are eligible for receiving moderation privileges. The criteria for serving as a moderator include the following: users must have been registered with the system for some time, i.e. for a number of hours greater than the constant "ProbationPeriod"; they must have recently read feature reviews below the root level, i.e. within the past number of hours specified by the constant "LogDeletionPeriod"; and they must have a karma value that is not negative, i.e. zero or more. Users who meet these criteria are eligible to receive the new moderation tokens that were generated in block 1505. The software logic below builds a pool of eligible users and distributes tokens to them. First, the function queries the Users table for all records that were created earlier than the number of hours ago specified by the constant "ProbationPeriod", have a karma value of zero or greater, and have a "deep read" count greater than zero (block 1515). The results of this query are stored in an array, stored in descending order of the number of reads (block 1517). That is, the most active users with the most reads are stored at the top of the table, while the users with the least reads are at the bottom. A subset of this table is specified by the constants "DiscardUpper" and "DiscardLower", which are decimal numbers in the range of zero to one. These constants specify which portion of the top and bottom of the list to exclude in order to eliminate the most active and least active users from the pool (blocks 1519 and 1521). Finally, for each of the moderation tokens that must be distributed, a user ID is chosen at random from the specified subset of the list of selected users, and the field "user_tokens" is incremented in that record (block 1523).

```
IncrementTokens(uid) {
    SELECT user_tokens FROM Users WHERE user_id = uid
    get tokens from record
    tokens++;
    UPDATE Users SET user_tokens = tokens WHERE user_id = uid
}
SelectUsers(int tokens)
{
    int usercount = 0;
    SELECT user_id, user_name, user_readcount, user_karma,
            user_tokens
    FROM Users
    WHERE DATE_ADD(user_createdate, interval ProbationPeriod
            hour) < now( )
        AND user_karma >= 0
        AND user_readcount > 0
    ORDER BY user_readcount DESC
    // count all eligible users
    for each record
        usercount++;
    // allocate table of user candidates
    eligible = (int *)malloc(usercount * sizeof(int));
    // populate table with id numbers of all eligible users
    for each record
        eligible[ecount++] = uidnum;
    // calculate upper and lower bound of selected users in table
    elo = (int)(DiscardLower * ecount);
    ehigh = (int)((1.0 − DiscardUpper) * ecount);
    erange = ehigh − elo + 1;
    for (z = 0; z < tokens; z++) {
        //calculate random table entry within range of
            selected users
        index = elo + (random( ) % erange);
        // increment the number of tokens for user ID at this entry
        IncrementTokens(eligible[index]);
    }
    // deallocate table
    free(eligible);
}
```

In block 1525-1527, the process converts the moderation tokens of selected users into actual moderation points, which are required for users to begin moderating ratings. The software logic below determines which users have accumulated enough moderation tokens to be converted into moderation points, as specified by the constant "TokenThreshold" (block 1525). For every record in the Users table in which the "user_tokens" field is greater or equal to this constant, the system calculates the number of moderation points that the tokens can be exchanged for, as specified by the constant "TokensPerPoint". The "user_tokens" field is decremented by the number of tokens that are exchanged for moderation points, and the "user_modpoints" is incremented by the appropriate number of "moderation_points" (block 1527).

```
// subtract tokens from user record
DeleteTokens(int uidnum, int droptokens) {
```

```
        SELECT user_tokens FROM Users WHERE user_id = uidnum
        get tokens from record
        tokens -= droptokens;
        UPDATE UserTable SET user_tokens = tokens WHERE
            user_id = uidnum
    }
    CashTokens( ) {
        SELECT user_id FROM Users WHERE user_tokens >=
        TokenThreshold
        for each record {
            get uidnum from record
            DeleteTokens(uidnum, TokenThreshold);
            points = TokenThreshold / TokensPerPoint;
                UPDATE Users SET user_modpoints = points
                WHERE user_id = uidnum
        }
    }
```

When the distributed moderation process of FIG. 15 is deployed in a publicly accessible environment, there are four variables that fundamentally determine its behavior: the number of users that register with the system; the number of ratings that users submit to the system; the number of times that users read pages showing ratings for particular features; and the number of moderations that users actually contribute after being granted moderation privileges. It is expected that the distributed moderation process will be most effective when the number of moderations submitted is at least 60%-80% of the number of ratings that are submitted. To achieve this ratio, administrators can tune the response of the process by adjusting the values of the following constants:

ProbationPeriod: the number of hours from the time that users register until they are eligible for receiving moderation tokens (the default value in the reference implementation is 72 hours).

LogDeletionPeriod: the number of hours that readership log records are maintained before they are expunged (the default value in the reference implementation is 48 hours).

ModerationPointExpirationPeriod: the number of hours that users have to apply their moderation points before they expire and are recycled (the default value in the reference implementation is 48 hours).

TokensPerRating: The number of moderation tokens that the system creates per rating submitted (the default value in the reference implementation is 5).

TokensPerPoint: The number of moderation tokens that are exchanged for each moderation point (the default value in the reference implementation is 5).

TokenThreshold: The number of moderation tokens that a user must receive to trigger the exchange for moderation points (the default value in the reference implementation is 5).

KarmaPseudoValue: The pseudo-value for adjusting the formula to calculate karma levels based on the ratio of (the default value in the reference implementation is 20).

DiscardUpper The percentage of users with the highest read-count to eliminate from the pool of eligible moderators, in order to exclude obsessive-compulsive users (the default value in the reference implementation is 0.15, i.e. the top 15% of readers are discarded)

DiscardLower The percentage of users with the lowest non-zero read-count to eliminate from the pool of eligible moderators, in order to exclude only casual readers (the default value in the reference implementation is 0.15, i.e. the bottom 15% of readers are discarded).

Advantageously, the computer-implemented method and system of the present invention as described herein enables a user to traverse through the feature set of one or more complex products. During such traversal, the user is presented with composite ratings for user-selected product features that reflect the suitability of the user-selected product features for the particular user's requirements. The computer-implemented method and system of the present invention can be adapted to provide collaborative evaluation of a wide variety of different products, such as computer systems and other office equipment, software (including open source applications and operating systems), networking and communication equipment and services (including cable television providers, internet service providers, cellular telephone service providers), financial service providers (e.g., banking services, insurance services, financial investment services), industrial equipment, building products and equipment, yard and garden products and equipment, home entertainment equipment (e.g., televisions and audio components), cameras and video equipment, appliances, automobiles and other vehicles, and other consumer products and services.

There have been described and illustrated herein several embodiments of a computer-implemented method and system for collaborative product evaluation. While particular embodiments of the invention have been described, it is not intended that the invention be limited thereto, as it is intended that the invention be as broad in scope as the art will allow and that the specification be read likewise. Thus, while particular data structures and methods have been disclosed, it will be appreciated that other data structure and methods can be used as well. In addition, while a particular hierarchical product feature schema has been disclosed, it will be understood that other product feature schemas can be used. Also, while moderation is performed by users of the system and distributed to select users though an automatic distributed moderation process, it will be recognized that the system can readily be adapted to provide for other forms of moderation. For example, administrator(s) of the system can select certain users (e.g., those with sincere and insightful comments) and grant moderation privileges to these select users. In another example, non-user administrators can provide the moderation of user-supplied ratings and comments. Furthermore, while particular web pages and interfaces have been disclosed, it will be understood that a wide variety of web pages and graphical user interfaces can be similarly used. Moreover, while particular methodologies have been disclosed in reference to the computation of composite ratings that are relevant to a set of user-selected product features, it will be appreciated that other methodologies for computing such composite ratings could be used as well. It will therefore be appreciated by those skilled in the art that yet other modifications could be made to the provided invention without deviating from its spirit and scope as claimed.

What is claimed is:

1. A computer-implemented method carried out by a computer processing system for user evaluation of at least one product that has a plurality of features whereby users operate user devices that are operably coupled to the computer processing system over network communication therebetween, the method comprising:

interacting with a plurality of users via the network communication between the user devices and the computer processing system to assign user-supplied ratings to features of a particular product, wherein the features of the at least one product are logically organized into a hierarchical structure of feature levels, and wherein each user supplied rating corresponds to a respective feature level and represents a user derived assessment of at least one feature of the corresponding feature level of the at least one product;

processing the user-supplied ratings at the computer processing system to associate moderation scores with the user-supplied ratings;

interacting with a given user via network communication between a given user device and the computer processing system to specify a threshold moderation score that defines a first range of acceptable moderation scores;

at the computer processing system, computing a composite rating for a given feature level of the at least one product based upon a set of the user-supplied ratings corresponding to the given feature level of the at least one product, wherein each user-supplied rating within the set is associated with a moderation score that falls within the first range of acceptable moderation scores, thereby omitting from the composite rating contributions of user-supplied ratings for the at least one product whose associated moderation scores fall outside the first range of acceptable moderation scores; and at the computer processing system, outputting the composite rating for supply to the given user via network communication between the computer processing system and the given user device;

wherein the processing of the computer processing system selectively enables particular users to evaluate the user-supplied ratings and associated moderation scores with the user-supplied ratings whereby the particular users are selectively enabled based upon moderation points earned by the particular users, and wherein the moderation points are limited in number and distributed to a respective user by an automatic process that accounts for positive evaluation of the respective user's own user-supplied ratings.

2. A computer-implemented method according to claim 1, further comprising:
processing user-supplied feedback at the computer processing system to derive a moderation score associated with a particular user-supplied rating.

3. A computer-implemented method according to claim 2, wherein:
the moderation score associated with a particular user-supplied rating is based upon a set of moderation scores each derived from user selection of a corresponding label from a plurality of labels that represent different levels of perceived credibility of the user that submitted the particular user-supplied rating.

4. A computer-implemented method according to claim 3, wherein:
the moderation score is generated by summing together the set of moderation scores and bounding the resultant sum by a predetermined maximum value and a predetermined minimum value.

5. A computer-implemented method according to claim 1, wherein:
the hierarchical structure of feature levels includes non-leaf feature levels and leaf feature levels, said non-leaf feature levels having at least one sub-feature level thereunder, and said leaf feature levels each do not have a single sub-feature level thereunder.

6. A computer-implemented method according to claim 5, wherein:
user interaction via network communication between user devices and the computer processing system is adapted to allow users to traverse the feature levels.

7. A computer-implemented method according to claim 5, wherein:
user interaction via network communication between user devices and the computer processing system is adapted to allow submission of ratings only for features corresponding to leaf feature levels, thereby omitting the submission of ratings for features corresponding to non-leaf feature levels.

8. A computer-implemented method according to claim 7, wherein:
the given feature level of the composite rating is selected by the user.

9. A computer-implemented method according to claim 7, wherein:
for the composite rating of a non-leaf feature level, the composite rating is based upon user-supplied ratings and weight factors associated with the sub-features of the non-leaf feature level.

10. A computer-implemented method according to claim 9, further comprising:
interacting with the given user via network communications between the given user device and the computer processing system to define the weight factors used in the computation of the composite rating for the non-leaf feature level.

11. A computer-implemented method according to claim 1, wherein:
the automatic process executed by the computer processing system distributes moderation points to the respective user based upon frequency that respective user had reviewed the user-supplied ratings of other users.

12. A computer-implemented method according to claim 1, wherein
the automatic process executed by the computer processing system distributes moderation points to the respective user based upon data representing the evaluation of the respective user's own user-supplied ratings by other users.

13. A computer-implemented method according to claim 1, wherein:
the automatic process executed by the computer processing system distributes moderation points to the respective user based upon usage data that is indicative of the temporal regularity of access and level of detail of access by the respective user.

14. A computer-implemented method according to claim 1, wherein:
the automatic process executed by the computer processing system distributes moderation points based upon the user-supplied feedback.

15. A computer-implemented method according to claim 1, wherein:
the automatic process executed by the computer processing system distributes moderation points based upon a ranking of a set of users, the ranking of a given user in the set derived from the user-supplied feedback pertaining to ratings submitted by the given user.

16. A computer-implemented method according to claim 1, wherein:
the user devices each include a web browser and the computer processing system comprises a web server, the web browser manipulating web pages served by the web server.

17. A system for user evaluation of at least one product that has a plurality of features whereby users operate user devices that are operably coupled to the system over network communication therebetween, the system comprising:
- a computer processing system which includes first software logic, second software logic, third software logic, fourth software logic, fifth software logic and sixth software logic, each operating on the computer processing system;
- the first software logic for interacting with a plurality of users via network communication between the user devices and the computer processing system to assign user-supplied ratings, wherein the features of the at least one product are logically organized into a hierarchical structure of feature levels, and wherein each user supplied rating corresponds to a respective feature level and represents a user derived assessment of at least one feature of the corresponding feature level of the at least one product;
- the second software logic for processing the user-supplied ratings to associate moderation scores to the user-supplied ratings;
- the third software logic for interacting with a given user via network communication between a given user device and the system to specify a threshold moderation score that defines a first range of acceptable moderation scores;
- the fourth software logic for computing a composite rating for a given feature level of the at least one product based upon a set of the user-supplied ratings corresponding to the given feature level of the at least one product, wherein each user-supplied rating within the set is associated with a moderation score that falls within the first range of acceptable moderation scores, thereby omitting from the composite rating contributions of user-supplied ratings for the at least one product whose associated moderation scores fall outside the first range of acceptable moderation scores;
- the fifth software logic for outputting the composite rating for supply to the given user via network communication between the system and the given user device; and
- the sixth software logic for selectively enabling particular users to evaluate the user-supplied ratings and associated moderation scores with the user-supplied ratings whereby the particular users are selectively enabled based upon moderation points earned by the particular users, and wherein the moderation points are limited in number and distributed to a respective user by an automatic process that accounts for positive evaluation of the respective user's own user-supplied ratings.

18. A system according to claim 17, further comprising:
seventh software logic operating on the computer processing system for processing user-supplied feedback at the computer processing system to derive a moderation score associated with a particular user-supplied rating.

19. A system according to claim 18, wherein:
the moderation score associated with a particular user-supplied rating is based upon a set of moderation scores each derived from user selection of a corresponding label from a plurality of labels that represent different levels of perceived credibility of the user that submitted the particular user-supplied rating.

20. A system according to claim 19, wherein:
the moderation score is generated by summing together the set of moderation scores and bounding the resultant sum by a predetermined maximum value and a predetermined minimum value.

21. A system according to claim 17, wherein:
the hierarchical structure of feature levels includes non-leaf feature levels and leaf feature levels, said non-leaf feature levels having at least one sub-feature level thereunder, and said leaf feature levels each do not have a single sub-feature level thereunder.

* * * * *